US011088371B2

(12) United States Patent
Fang et al.

(10) Patent No.: US 11,088,371 B2
(45) Date of Patent: Aug. 10, 2021

(54) METHOD OF PRODUCING STABLE, ACTIVE AND MASS-PRODUCIBLE PTNI CATALYSTS THROUGH PREFERENTIAL CO ETCHING

(71) Applicant: The Research Foundation for the State University of new York, Binghamton, NY (US)

(72) Inventors: Jiye Fang, Vestal, NY (US); Yiliang Luan, Binghamton, NY (US)

(73) Assignee: The Research Foundation for The State University, Binghamton, NY (US)

( * ) Notice: Subject to any disclaimer, the term of this patent is extended or adjusted under 35 U.S.C. 154(b) by 0 days.

(21) Appl. No.: 16/659,314

(22) Filed: Oct. 21, 2019

(65) Prior Publication Data

US 2020/0119368 A1 Apr. 16, 2020

Related U.S. Application Data

(63) Continuation of application No. 15/851,232, filed on Dec. 21, 2017, now Pat. No. 10,454,114.

(Continued)

(51) Int. Cl.
*H01M 4/92* (2006.01)
*H01M 4/86* (2006.01)
(Continued)

(52) U.S. Cl.
CPC ........... *H01M 4/921* (2013.01); *B01J 23/892* (2013.01); *B01J 37/0072* (2013.01); *C22C 5/04* (2013.01);
(Continued)

(58) Field of Classification Search
CPC ....... B01J 23/892; B01J 37/0072; C22C 5/04; C22C 19/03
(Continued)

(56) References Cited

U.S. PATENT DOCUMENTS 4,985,386 A * 1/1991 Tsurumi ................... B01J 27/22
429/524
8,592,339 B2 * 11/2013 Fang ................... B01J 23/8906
502/326

(Continued)

FOREIGN PATENT DOCUMENTS

JP          2001-052718    * 2/2001   .............. H01M 4/92

OTHER PUBLICATIONS

Jianbo Wu et al., "Shape and Composition-Controlled Platinum Alloy Nanocrystals Using Carbon Monoxide as Reducing Agent." Nano Letters 2011, 11, pp. 798-802. (Year: 2011).*

(Continued)

*Primary Examiner* — Patricia L. Hailey
(74) *Attorney, Agent, or Firm* — Hoffberg & Associates; Steven M. Hoffberg

(57) ABSTRACT

A method of forming metallic particles, comprising: providing precursor particles comprising a transition metal alloy; supplying carbon monoxide (CO) under reaction conditions which differentially remove a first alloy metal from the precursor particles at a faster rate than a second alloy metal; and, maintaining the reaction conditions until the precursor particles are converted to the particles. The precursor particles may comprise $PtNi_4$, and the particles may be $Pt_3Ni$, formed as hollow nanoframes on a carbon support.

20 Claims, 17 Drawing Sheets

Related U.S. Application Data

(60) Provisional application No. 62/438,226, filed on Dec. 22, 2016.

(51) Int. Cl.
*C22C 5/04* (2006.01)
*B01J 23/89* (2006.01)
*B01J 37/00* (2006.01)
*C22C 19/03* (2006.01)

(52) U.S. Cl.
CPC ........... *C22C 19/03* (2013.01); *H01M 4/8657* (2013.01); *H01M 4/926* (2013.01)

(58) Field of Classification Search
USPC ......... 502/185, 326, 337, 339; 420/456, 466
See application file for complete search history.

(56) References Cited

U.S. PATENT DOCUMENTS

| | | | | |
|---|---|---|---|---|
| 10,099,207 | B2 * | 10/2018 | Stamenkovic | B01J 23/892 |
| 2006/0280997 | A1 * | 12/2006 | Yoo | H01M 4/921 502/326 |
| 2011/0124499 | A1 * | 5/2011 | Fang | B01J 23/8906 502/326 |
| 2013/0085061 | A1 * | 4/2013 | Stamenkovic | H01M 4/921 502/185 |
| 2013/0133483 | A1 * | 5/2013 | Yang | B22F 1/0018 75/351 |
| 2015/0017570 | A1 * | 1/2015 | Yang | H01M 4/926 429/523 |
| 2015/0236355 | A1 * | 8/2015 | Yang | H01M 4/921 429/405 |
| 2016/0039008 | A1 * | 2/2016 | Humphrey | B22F 1/0018 420/462 |

OTHER PUBLICATIONS

Tiantian Shen et al., "Facile Synthesis of Pt3Ni alloy nanourchins by temperature modulation and their enhanced photocatalytic properties." Journal of Alloys and Compounds 645, pp. 309-316. (Year: 2015).*

Zhenmeng Peng et al., "Designer platinum nanoparticles: Control of shape, composition in alloy, nanostructure and electrocatalytic property." Nano Today 4, pp. 143-164. (Year: 2009).*

Yu Wang et al., "Phase-transfer interface promoted corrosion from PtNi 10 nanoctahedra to Pt4Ni nanoframes." Nano Research 8, (1), pp. 140-155. (Year: 2015).*

* cited by examiner

| {hk0} Angle | α | β |
|---|---|---|
| {210} | 126.87° | 143.13° |
| {730} | 133.60° | 136.40° |
| {520} | 136.40° | 133.60° |
| {310} | 143.13° | 126.87° |

| Average Composition<br>Position | Pt | Ni |
|---|---|---|
| Corner | 21.4 | 78.6 |
| Inside | 9.4 | 90.6 |
| Center | 25.0 | 75.0 |

…

METHOD OF PRODUCING STABLE, ACTIVE AND MASS-PRODUCIBLE PTNI CATALYSTS THROUGH PREFERENTIAL CO ETCHING

CROSS-REFERENCE TO RELATED APPLICATIONS

The present application is Continuation of U.S. patent application Ser. No. 15/851,232, filed Dec. 21, 2017, now U.S. Pat. No. 10,454,114, issued Oct. 22, 2019, which is a non-provisional of, and claims the benefit of priority under 35 U.S.C. § 119 from, U.S. Provisional Patent Application No. 62/438,226, filed Dec. 22, 2016, the entirety of which are expressly incorporated herein by reference.

BACKGROUND OF THE INVENTION

Engineering crystal structures in nanoscale is challenging, yet provides an effective way to improve catalytic performances. Platinum (Pt)-based nanoframes are a new class of nanomaterials that have great potential as high-performance catalysts. To date, these nanoframes are formed through acid etching in aqueous solutions, which demands long reaction time and often yields ill-defined surface structures. Metallic nanocages are discussed in [38]: synthesis of bimetallic Pt-palladium (Pd) hollow dendritic nanoparticles with dendritic shells by selective chemical etching with nitric acid. Creation of hollow metallic nanostructures is discussed in [39]: one-pot aqueous synthesis of hollow Pd/Pt single-crystalline nanocubes [40] describes hollow Pt spheres with nano-channels: synthesis and enhanced catalysis for oxygen reduction, using silver (Ag) nanoparticles as sacrificial templates. Hollow/rattle-type mesoporous nanostructures by a structural difference-based selective etching strategy, using, for example, ammonia solution as an etchant is discussed in [41]. Pt-centered yolk-shell nanostructure formation by sacrificial nickel (Ni) spacers on a silica core, using a microemulsion methods discussed in [42]. A process for making superparamagnetic CoPt nanospheres is described in [43]. $NaBH_4$ is added to a solution of $CoCl_2$ and poly(vinyl) pyrrolidone, followed by $K_2PtCl_6$. A two-step process for preparing porous Pt nanocrystals (NCs) from $K_2PtCl_4$ using L-ascorbic acid as the reducing agent is described in [44], following procedures of Meyer et al. [51], without any $Na_3$-citrate added. Synthesis of Pd—Rh core-frame concave nanocubes, and their conversion to Rh cubic nanoframes by selective wet etching of the Pd cores is discussed in [45]. Etched Pt nanoparticles were formed by etching Ag using nitric acid [46], resulting in elementally pure nanocubes.

US 20150236355, expressly incorporated herein by reference in its entirety, provides oleylamine capped $PtNi_3$ polyhedral nanoparticles in hexane and/or chloroform, which are spontaneously converted to $Pt_3Ni$ nanoframes, under ambient conditions (laboratory air, having an air pressure within 10% of 101.3 kPa and an overall oxygen content by weight between 18% and 25%), in two weeks. After dispersion of $PtNi_3$ nanoframes onto a high surface area carbon support (e.g., Vulcan XC-72) and subsequent thermal treatment between 370° C. and 400° C., the $Pt_3Ni$ nanoframe surfaces tend toward a Pt{111}-skin structure.

The Mond process was originally developed to purify Ni from ore. It treats the ore with carbon monoxide (CO), to complex the Ni separate from other elements. The general process may be applied to form transition metal complexes with Ni, Iron (Fe), Cobalt (Co), Chromium (Cr), Tungsten (W), Molybdenum (Mo), Rhenium (Re), and Ruthenium (Ru), for example. The corresponding formed products are $Ni(CO)_4$, $Fe(CO)_5$, $Co_2(CO)_8$, $Cr(CO)_6$, $W(CO)_6$, $Mo(CO)_6$, $Re_2(CO)_{10}$ and $RuCO_5$. It is noted that it is also known that mixed complexes may be formed, only partially carbonylated. It is also known that the transition metals can be pulled off a substrate, or deposited onto a substrate, depending upon temperature and pressure of the carbonyl gas or gas mixture. The various transition metals are shown in Table 3:

The transition elements include Scandium (Sc); Titanium (Ti); Vanadium (V); Chromium (Cr); Manganese (Mg); Iron (Fe); Cobalt (Co); Nickel (Ni); Copper (Cu); Zinc (Zn); Yttrium (Y); Zirconium (Zr); Niobium (Nb); Molybdenum (Mo); Technetium (Tc); Ruthenium (Ru); Rhodium (Rh); Palladium (Pd); Silver (Ag); Cadmium (Cd); Hafnium (Hf); Tantalum (Ta); Tungsten (W); Rhenium (Re); Osmium (Os); Iridium (Jr); Platinum (Pt); Gold (Au); and Mercury (Hg). While highly unstable man-made elements have limited use, Technetium finds the medical application. The lowest oxidation states are exhibited in metal carbonyl complexes such as $Cr(CO)_6$ (oxidation state zero) and $[Fe(CO)_4]^{2-}$ (oxidation state −2) in which the 18-electron rule is obeyed. These complexes are also covalent. Ionic compounds are mostly formed with oxidation states +2 and +3. In aqueous solution the ions are hydrated by (usually) six water molecules arranged octahedrally. The reactivity of these transition elements to form carbonylates varies significantly across the range and with different reaction conditions, thus leading to the possibility of differential reactions and separations of the various metals.

The carbonyl or Mond process was discovered in 1884 when Ludwig Mond noticed that hot CO gas would severely corrode Ni. Mond demonstrated that element Ni could be extracted from its ores above 50° C. by CO that acts as both the complex ligand and reducing agent to form a gaseous compound, $Ni(CO)_4$, which is stable up to 230° C. Above 230° C., Ni and CO can be recovered again from the decomposition of $Ni(CO)_4$. The process exploits the ability of CO to form compounds with transition elements from the vanadium group to the nickel group of the periodic table. These transition elements undergo carbonyl or carbonyl+ additional gas reactions. The process works particularly well for Ni, Fe, and Co and is most mature in these alloy systems. A known process for winning Ni operates by treating an aqueous ammonium salt solution of Ni salts with a CO-containing gas under reducing conditions to produce nickel carbonyl and subsequently recovering Ni. Optionally, the production of nickel carbonyl can be catalyzed, for example, by cyanide. Also, an essentially water-immiscible solvent for nickel carbonyl can optionally be employed. The aqueous ammoniacal solution is typically an aqueous ammoniacal ammonium chloride, carbonate, sulfate, hydroxide, or mixture thereof. The valuable metals associated with Ni, e.g., Cu, Co, Fe, and precious metals, are also separated and recovered by this process.

See, U.S. Pat. Nos. 9,309,121; 9,023,402; 8,852,315; 8,840,552; 8,759,058; 8,722,270; 8,703,089; 8,404,226; 8,287,838; 8,124,347; 7,967,891; 7,964,220; 7,910,680; 7,892,687; 7,799,315; 7,790,189; 7,776,129; 7,767,643; 7,625,410; 7,606,274; 7,410,941; 7,345,019; 7,309,687; 7,270,728; 7,198,770; 7,011,854; 6,924,049; 6,828,054; 6,770,394; 6,751,516; 6,746,511; 6,649,299; 6,641,767; 6,506,229; 6,007,634; 5,736,109; 5,541,003; 5,532,292; 5,362,580; 5,197,993; 5,147,687; 5,146,481; 5,092,967; 5,052,272; 5,010,804; 4,734,219; 4,659,426; 4,579,722; 4,315,757; 4,273,724; 4,243,644; 4,160,745; 4,137,259; 3,967,958; 0,455,230; 20160258053; 20160189816; 20130126295; 20120220010; 20120204680; 20110277590;

20110237546; 20110111310; 20110059009; 20110017493; 20100275731; 20100273149; 20100246610; 20090297709; 20080267810; 20070277648; 20070061006; 20070034053; 20070007121; 20060276493; 20060233890; 20060148900; 20050233187; 20050044991; 20050013771; 20040241063; 20040204785; 20040109810; 20040067261; 20040003680; 20030157347; 20020102446; 20020088306; 20010033956; 20010031389; and 20010026884, each of which is expressly incorporated herein by reference in its entirety.

SUMMARY OF THE INVENTION

The present technology provides a method for facile development of high-performance nanoframe catalysts using size and crystallographic face-controlled $PtNi_4$ tetra-hexahedral (THH) NCs prepared through a colloidal synthesis as precursors.

This protocol is inspired by the Mond process and employs CO etching of carbon supported $PtNi_4$ THH NCs at an elevated temperature to preferentially de-alloy Ni-component in the <100> direction. The resultant $Pt_3Ni$ THH nanoframes possess an open, stable and high-indexed microstructure, containing a segregated Pt thin layer strained to the Pt—Ni alloy surfaces. Density Functional Theory (DFT) calculations show a down-shift d-band center (Vienna ab initio Simulation Package (VASP), based on the projector-augmented wave pseudo-potential. The d-band center was calculated from the equation:

$$\varepsilon_d = \frac{\int \rho E_d dE_d}{\int \rho dE_d},$$

where $\rho$ and $E_d$ represent the density and energy of the d bands, which can be obtained from the density of states (DOS)). These nanoframes exhibit much improved catalytic performance, such as high stability under prolonged electrochemical potential cycles, promoting direct electro-oxidation of formic acid to $CO_2$ and enhancing oxygen reduction reaction activities.

Because CO can be generated from the carbon support through thermal annealing in a limited amount of air, a common process for pretreating supported catalysts, the technology can be easily adopted for preparing industrial scale catalysts that are made of Pt—Ni and other alloy nanoframes.

The present technology, according to one embodiment, employs a process for extracting a reactive transition metal (e.g., Ni) from a solid phase alloy ($PtNi_4$) with a relatively noble metal (e.g., Pt), by selectively forming a transition metal carbonyl complex (e.g., $Ni(CO)_4$) in a distinct phase (liquid or gaseous), to thereby selectively alter the alloy composition (to, e.g., $Pt_3Ni$). Preferably, the alloy has at least one component for which formation of a volatile transition metal carbonyl complex is significantly more favorable than the formation of a complex in the distinct phase than another alloy component. Thus, the process selectively enriches the product with the other alloy components. The product preferably has a large surface area, and small particles, so that over a feasible time period, the transformation can result in a homogeneous product. However, in some cases, regional variation in alloy composition is tolerable or desirable. For example, in larger particles, the relatively noble metal may be enriched in the alloy on the particle surface, while the particle core may remain with a higher proportion of the reactive transition metal.

Pt is ubiquitously used in catalysis owing to its distinct surface electronic structure that enables its bonding to various adsorbates with appropriate strength. To maximize the efficiency of utilization of this precious metal, extensive efforts have been geared to control their shape, size and composition of Pt and Pt-based alloy NCs, which strongly correlate to the electronic structure and surface atomic arrangement [1]. In particular, Pt-based alloy NCs have been extensively investigated due to the possibility to tune the d-band center position, which correlates to the adsorption strength of the catalyst surface, through the strain and ligand effects [2]. Rationally engineering both the architecture and microstructure of Pt-based catalysts at nano-scale is an effective strategy to achieve desirable catalytic properties [3,4]. De-alloying the less noble transition metal from Pt-bimetallic NCs is a common approach to produce porous architecture and microstructures with surface strains [5]. These features have been proven as the key factors for enhancing catalytic activity [6]. Electrochemical potential cycling and selective solution etching are frequently applied methods for the de-alloying. However, the resultant nanostructures typically have severely deformed morphologies and defect-rich surfaces, which make it arduous to acquire pre-designed microstructure and overall architecture [5,7]. In contrast, thermal annealing can relieve the excessive internal stress to avert plastic deformation [8]. In addition, the thermal energy may drive surface restructuring to reach a thermodynamic equilibrium structure and thus generate a uniform microstructure where a Pt thin layer is segregated on the surface. In view of these lines of reasoning, de-alloying of Pt-based NCs through solid-state processing can be a more effective way to achieve 3D open architecture with controllable microstructures [9].

The present technology provides a strategy for generating high-indexed, open-structured, stable and highly active Pt-alloys, e.g., $Pt_3Ni$, catalysts through a gaseous phase reaction to de-alloy a secondary metal from the Pt-alloy, e.g., Ni from $PtNi_4$ THH NCs. According to the preferred embodiment, resultant $Pt_3Ni$ nanoframes have a unique microstructure of a segregated Pt skin layer strained on top of Pt—Ni alloy with a down-shifted d-band center, which greatly improves catalytic performance in an acidic reaction environment. A method of preparation is provided which maximizes the utilization of Pt and provides an efficient route for mass-production of advanced Pt-based catalysts.

Experimental results using the preferred $Pt_3Ni$ nanoframes show a high activity of these porous nanocatalysts in catalyzing several fuel cell reactions, including formic acid oxidation, methanol oxidation, and oxygen reduction reaction (ORR). These nanoframes are stable, and remain intact even after 5000 electrochemical potential cycles in 0.1 M $HClO_4$ solution without shape and composition degradation.

While a preferred embodiment employs a Pt/Ni alloy, other possible alloy systems include a metal which does not ordinarily form volatile carbonyl complexes, or forms unstable or non-volatile complexes under reaction conditions, such as platinum group elements (e.g., Pt, Pd, Au), and at least one other transition metal that forms a reasonably stable and volatile carbonyl complex under reaction conditions, such as Pt/Ir, Pt/Fe, Pt/Co, Pt/Cr, Pt/Ru, Pt/Mo, Pt/Re, Au/Ni, Au/Fe, Au/Co, Au/Cr, Pd/Ni, Pd/Fe, Pd/Co, Pd/Cr, Pd/Mo and as well as ternary and quaternary (or higher order) alloys involving any of these metals. See, U.S. Pat. Nos. 5,593,934, 5,013,618, 5,149,680, 20070082814, expressly incorporated herein by reference in their entirety. Of course, the alloy should include a secondary metal which is in fact etched by CO or an analogous etchant. For example, various metals are known to form gaseous (low boiling point) compounds with fluorine, such as uranium and tungsten, or chlorine, such as chromium, and transition metals may form low boiling point compounds with certain organic or aromatic compounds, e.g., metallocenes such as ferrocene.

As noted above, the starting alloy may include Pt (or another metal that has a relatively low level of complex formation with CO) as a minority component, which through the etching process can become a predominating metal. The process may proceed to completion, or intermediate and/or heterogeneous products provided. Completion may mean, in this case, the reliable formation of a homogeneous material, e.g., $Pt_3Ni$, and does not require refining to pure Pt. As noted above, the produce of the etching may be heterogeneous, with a Pt shell and $Pt_3Ni$ core portions.

The present technology achieves high stability: it is capable of fabricating hollow structured Pt-based alloy, e.g., $Pt_3Ni$ nanocatalysts, using a gaseous etchant through thermal annealing. The selective etching of Ni atoms from preferential crystal direction acts as a critical factor that prevents the deformation of nanoframes, whereas the internal stress generated during the hollowing process is relieved through the thermal annealing and the accompanying surface restructuring. The resultant $Pt_3Ni$ THH nanoframes are robust and remain intact even after 5000 electrochemical potential cycles in $HClO_4$.

The present technology achieves high reactive activity: since the high-indexed and hollow nanostructure possesses a synergetic feature of a down-shift d-band center, these resultant $Pt_3Ni$ nanocatalysts favor high catalytic activity towards formic acid oxidation, methanol oxidation, and ORR. For example, in comparison with the state-of-the-art Pt/C nanocatalyst, it was determined that the mass and specific activity ratios of ORR between the present carbon-supported nanoframes and a known Pt/C catalyst are at least 5-times and 10-times, respectively.

The present technology, according to one embodiment, employs an easy process with a direct path to efficient scaling-up. The ability to form nanoframes directly on carbon black supported $PtNi_4$ precursors, can be accomplished by externally supplied CO, which can be directly controlled in terms of concentration, flowing rate, time profile, etc., or through a gas annealing route, which produces CO in situ by a partial oxidation of the carbon support, which is not only an economic avenue to engineer surface-structure controlled catalysts with improved properties, but facilitates mass-production. The formation of the CO locally, in situ, ensures that this reactant is properly distributed in a reaction chamber, and may also be used to create large-scale (much larger than particle size) variations by tuning e.g., the temperature, reactive illumination, amount of carbon support and/or oxygen on a regional basis during the process. For example, a particular process may proceed by way of a multistep catalytic process, during which different types of catalysts (or in some cases, lack of catalyst) may be preferred. The present process, therefore, allows the formation of the catalytic particles in a late stage of manufacturing, after the precursor particles are deposited on a surface. By employing region-selective particle transformation, a reactor core may be initially coated with a uniform (homogeneous) particle coating, and then subsequently transformed in a region-selective manner.

The technique may be readily extended to other binary (or higher order) metallic catalyst systems: with the mechanism identified in the present invention, this approach may be extended to other metallic alloy systems for engineering desirable and stable nanocatalysts.

The present technology reveals that CO may be used as an efficient and effective etchant gas to de-alloy Ni from its alloy nanoparticles. CO is a known etchant for semiconductor processes, derived from an in situ reaction of halocarbon plasma with oxygen. See, e.g., U.S. Pat. No. 5,308,414; 4847792; 4846928, 4861419; 7419891; and 4654224, each of which is expressly incorporated herein by reference in its entirety.

$Pt_3Ni$ THH nanoframes with an open, stable and high-indexed microstructure can be simply prepared through a CO etching of carbon supported $PtNi_4$ THH NCs (the core technique).

$PtNi_4$ THH NCs can be pre-prepared as precursors using a colloidal reaction containing e.g., $PtCl_4$, $NiCl_2 \cdot 6H_2O$, oleylamine and 1-octadecene. The $PtNi_4$ THH NCs are then loaded on carbon black as the support according to a fraction. The process of de-alloying Ni from the $PtNi_4$ THH NCs may be carried out by annealing carbon-supported $PtNi_4$ NCs in the presence of a specific gaseous component, e.g., CO. The generated carbon-supported and hollow $Pt_3Ni$ nanoframes can be directly used as fuel cell catalysts.

The products of this reaction are hollow, stable and active $Pt_3Ni$ nanoframes supported on carbon black. As superior catalysts, this product is especially useful in following fuel cell reactions: formic acid oxidation catalysis; oxygen reduction catalysis; and methanol oxidation catalysis. Due to the presence of its high-indexed $Pt_3Ni$ surfaces, it may also be used as a catalyst of certain types of organic reactions, such as hydrogenation. The catalysts may also be used in CO/NO oxidation reactions.

Open-structured Pt—Ni rhombic dodecahedral nanoframes containing {110} external surfaces were previously synthesized and enhanced ORR activity from these catalysts was reported [6]. Similar structured Pt—Ni THH nanoframes consisting of high-indexed external surfaces were recently prepared [6], showing improved performance in both ORR and alcohol oxidation reactions (both methanol and ethanol). Compared to this prior work, the present nanoframes possessing high-indexed surfaces have been pre-stabilized on carbon support, which means that these THH catalysts not only have those advantages as demonstrated in the previous work, such as highly open structure and activities (to facilitate easy molecular access) but also overcome the issues of deformed particle morphologies and defect-rich surfaces on the resultant nanocatalysts during the etching process. Such stabilized and well-controlled high-indexed Pt-based catalysts could also favor some organic reactions such as hydrogenolysis, isomerization, and aromatization which are widely involved in the petroleum industry.

Compared to [6], the present technology employs a distinct preparation technique, and the resulting nanoframe exhibits unique properties. In contrast to 10 hours or 24 hours in an aqueous acid etching process, as typically used according to the known techniques, the present thermal annealing technique with gaseous de-alloying needs only about 45 minutes. Another advantage is that the carbon support is involved in the Ni-de-alloying process, which can greatly enhance the stability of the resultant catalysts in both structure and composition.

The nanoframes are generated using gas-phase reactions, which feature fast, stable and large-scale production. Compared to commonly used acidic solution-based etching process, the resultant nanoframes have better-defined surface structure, which is of significance for catalytic applications, especially in improving the catalytic activity and stability. The gas-annealing of supported metal NCs is a very commonly used practice to sinter catalyst in catalysis, therefore the developed process can be adopted for other systems, such as Pt—Fe, Au—Fe and Pd—Ni binary systems and other Ni-based higher order alloy systems, to engineer catalysts with novel hollow structures. The nanoframes could be easily generated through a regular thermal annealing process using the etchant gas and colloidal chemistry-yielded $PtNi_4$ THH NCs as the precursors. It can be scaled up to a mass-production technique in fuel cell industry.

Preparation of the $PtNi_4$ THH precursors is preferably well-controlled. Alternatively, the same precursors synthesized via a different method were also reported in [6].

It is therefore an object to provide a method of forming metallic particles, comprising: providing precursor particles comprising a transition metal alloy; supplying CO under reaction conditions which differentially remove a first alloy metal from the precursor particles at a faster rate than a second alloy metal; and maintaining the reaction conditions until the precursor particles are converted to the particles. It is also an object to provide particles or nanoparticles formed using the method. It is a further object to use the particles or nanoparticles so formed in a process, such as, as a catalyst.

It is also an object to provide metallic nanoparticles, formed by a process comprising: providing precursor nanoparticles comprising a transition metal alloy; supplying CO under reaction conditions which differentially remove a first alloy metal from the precursor nanoparticles at a faster rate than a second alloy metal; and maintaining the reaction conditions until the precursor nanoparticles are converted to the nanoparticles, the nanoparticles being characterized as being tetrahexahedral hollow nanoframe structures that are more catalytically active than the precursor particles.

It is a further object to provide a structure of $Pt_3Ni$ THH nanoframes, comprising a segregated Pt thin layer strained to the $Pt_3Ni$ alloy surfaces having a down-shift d-band center.

The precursor nanoparticles may be predominately Ni and the nanoparticles may be predominately Pt. The precursor particles may comprise the transition metal alloy $PtNi_4$. The particles may be converted to a transition metal alloy $Pt_3Ni$. The nanoparticles may comprise $Pt_3Ni$ THH nanoframes, comprising a segregated Pt thin layer strained to the $Pt_3Ni$ alloy surfaces having a down-shift d-band center. The nanoparticles may be supported on carbon particles, e.g., carbon black. The precursor particles may comprise a size and crystallographic facet controlled $PtNi_4$ THH NCs prepared through a colloidal synthesis as precursors.

The metallic nanoparticles may be catalytically active as at least one of an ORR catalyst, alcohol oxidation reaction catalyst, a CO/NO oxidation reaction catalyst; a hydrogenolysis catalyst, an isomerization catalyst, and an aromatization reaction catalyst.

The particles may be NCs. The particles may be NC frames. The particles may be THH NC frames.

The reaction conditions for forming the particles may be non-aqueous, or in some cases, aqueous and/or anhydrous solution phase.

Ni in the transition metal alloy may be preferentially de-alloyed in the <100> direction through CO etching at a temperature of about 170° C.

The particles may comprise $Pt_3Ni$ THH nanoframes, comprising a segregated Pt thin layer strained to the $Pt_3Ni$ alloy surfaces having a down-shift d-band center.

The precursor particles may comprise a Pt—Ni alloy, and the CO under the reaction conditions etches the Ni to form $Ni(CO)_4$.

The precursor particles may comprise $PtNi_4$ transition metal alloy THH nanoparticles, prepared using a colloidal reaction mixture containing $NiCl_2.6H_2O$, oleylamine and 1-octadecene, loaded on a carbon black support.

The particles may comprise hollow, stable and catalytically active $Pt_3Ni$ nanoframes supported on carbon black.

The reaction conditions forming the particles may be maintained for less than 2 hours, or less than 1 hour, or less than 45 minutes, or less than 30 minutes, or less than 20 minutes, or less than 10 minutes, or less than 5 minutes, or less than 1 minute. Longer processing times may also be employed.

The precursor particles may comprise a Pt—Ni alloy, Pt—Fe alloy, Pt—Ni—Fe alloy, Pt—Co alloy, Pt—Co—Fe alloy, Au—Ni alloy, Au—Fe alloy, Au—Cu—Ni, Au—Co alloy, Au—Co—Fe alloy, Pd—Ni, or Pd—Fe, for example.

DETAILED DESCRIPTION OF THE PREFERRED EMBODIMENTS

The present technology provides a protocol for fabricating catalytic particles, e.g., $Pt_3Ni$ THH nanoframes, with controlled microstructures. The THH shape was chosen in light of the improved catalytic activity of formic acid and ethanol electro-oxidation on Pt THH NCs with high indexed facets [10]. $PtNi_4$ THH NCs with well-defined {730} facets and segregated Pt on the edges were synthesized as the "precursors" via a colloidal method (FIG. 1A) [11]. A process to de-alloy and extract Ni from $PtNi_4$ THH NCs was carried out by annealing carbon-supported $PtNi_4$ NCs in the presence of CO, similar to the Mond process [12]. The obtained $Pt_3Ni$ nanoframes preserve the THH profile and present 3D open-structure comprising ridges as thin as a few nanometers (FIGS. 1B and 1C). In this process, the selective etching of Ni atoms from the <100> direction is an important factor that prevents the deformation of THH frames, whereas the internal stress generated during the hollowing process is relieved through the thermal annealing and the accompanying surface restructuring. Moreover, the thermal treatment resulted in an alloy of the segregated Pt and the remaining Ni atoms, diminishing the uncontrollable vacancy defects and generating stable and well-defined microstructures of a strained Pt thin layer on top of $Pt_3Ni$ high-indexed planes. The resultant $Pt_3Ni$ THH nanoframes are robust, and remain intact even after 5,000 electrochemical potential cycles in $HClO_4$ (FIG. 1D). Such $Pt_3Ni$ THH nanoframes not only provide easy access for reactants to both internal and external active sites but also possess desirable electronic structure for the adsorption of molecules, rendering superior catalytic performance. This method provides an ideal paradigm for engineering both the architecture and the microstructure of NCs through a combination of colloidal approach and solid-state processing, which may be applied to other bimetallic systems.

Figure 1A:
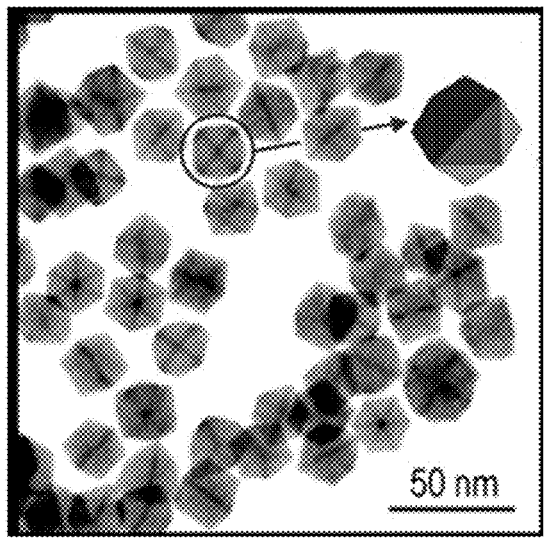
FIGS. 1A-1F show electron microscope (EM) images of THH NCs and nanoframes.
Figure 1C:
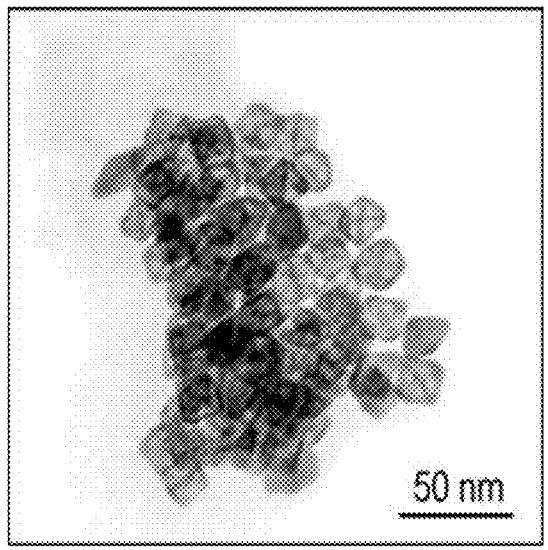
Figure 1B:
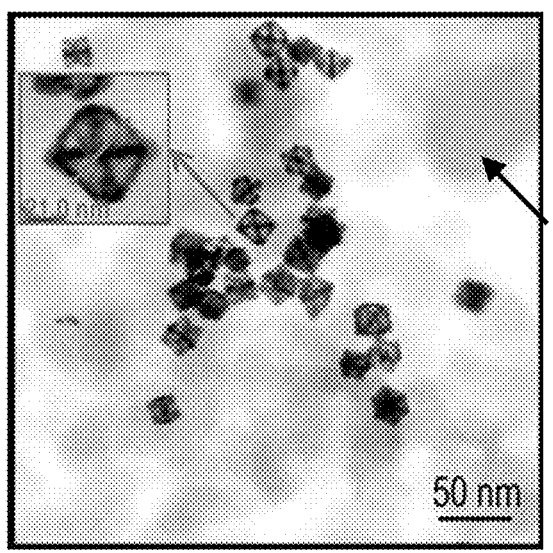
Figure 1D:
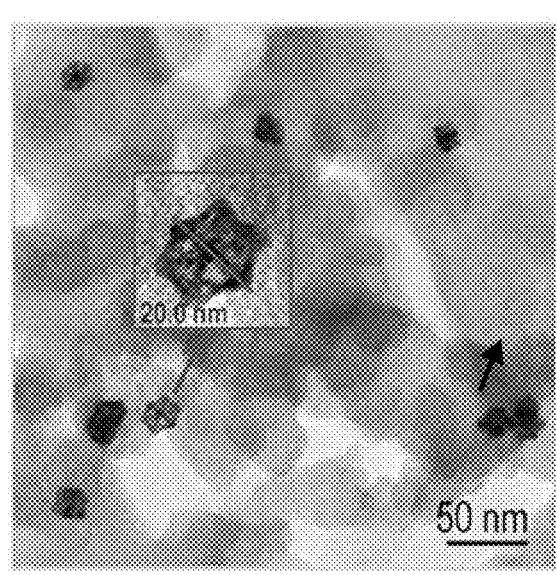
Figure 1E:
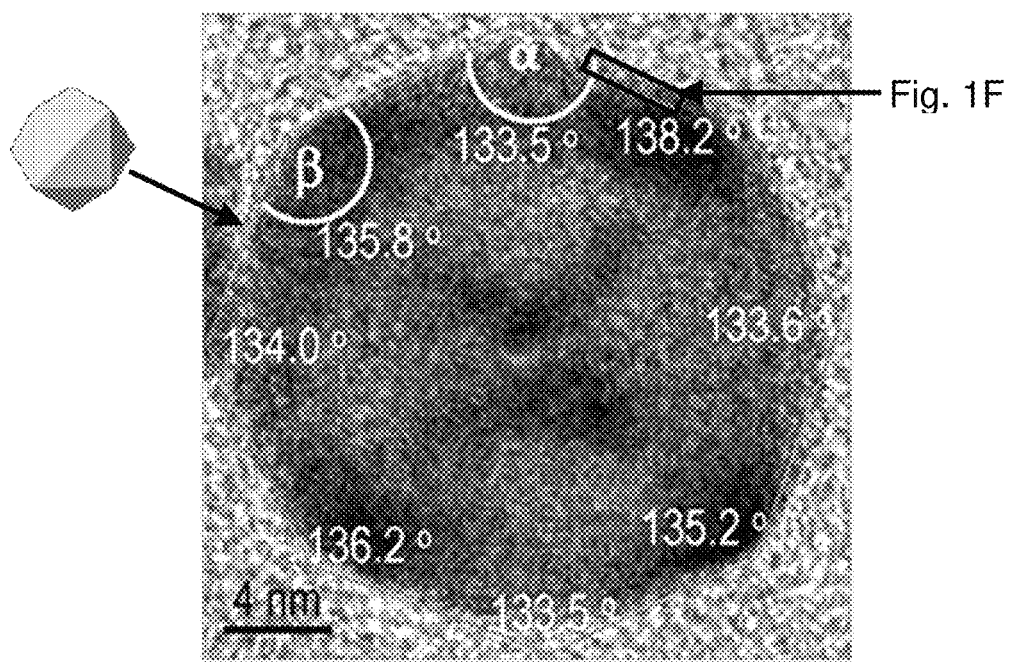
Figure 1F:
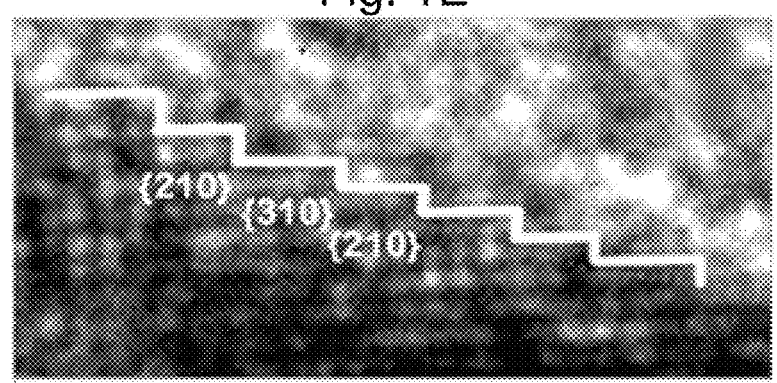
Figure 1G:
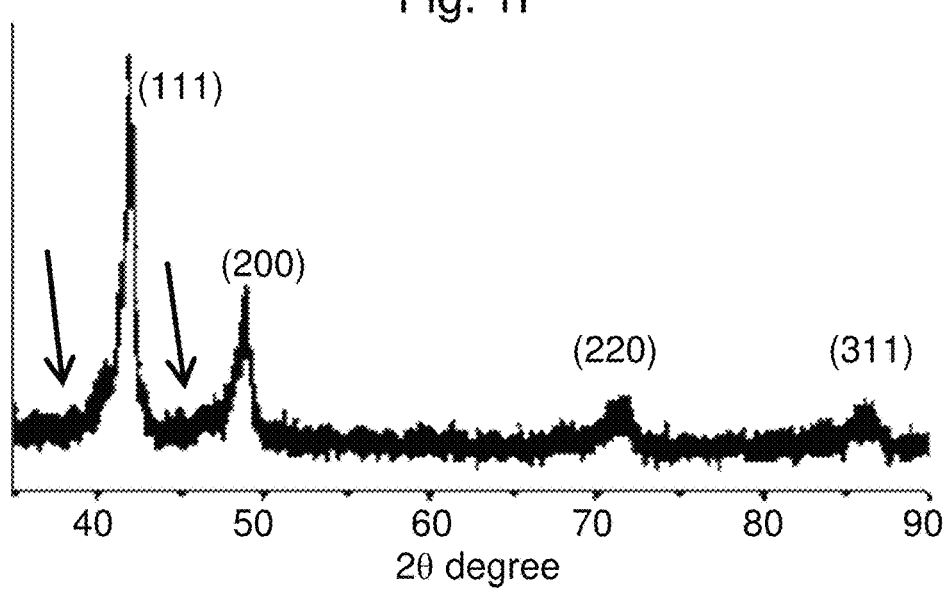
FIG. 1G shows an FFT pattern of THH NCs.

FIGS. 1A-1G show electron microscope images of THH NCs and nanoframes. FIG. 1A shows a HAADF-STEM image of THH $PtNi_4$ NCs (the inset is a THH model along the <001> zone axis). FIG. 1B shows a HAADF-STEM image of THH nanoframes on carbon evolved by CO thermal annealing. FIG. 1C shows a HAADF-STEM image of THH nanoframes on carbon yielded by annealing in air. FIG. 1D shows a TEM image of air-annealing generated nanoframes after 5,000 electrochemical potential cycles from 0.6 to 1.0 V vs RHE at 0.5 V/s in 0.1M $HClO_4$, showing that the THH profile is perfectly preserved. FIG. 1E shows an HRTEM image of a single $PtNi_4$ THH NC recorded along the <001> zone axis with an indexation of the measured angles between surfaces. FIG. 1F shows an HRTEM image zoomed from the boxed area in FIG. 1E, displaying the surface atomic steps marked as 12101 and {310}; a corresponding FFT pattern with a square symmetry illustrated in FIG. 4D confirms the <001> projection orientation. FIG. 1G shows an X-ray diffraction (XRD) pattern of the obtained THH NCs, showing the alloy phase with the fcc structure.

Figure 4A:
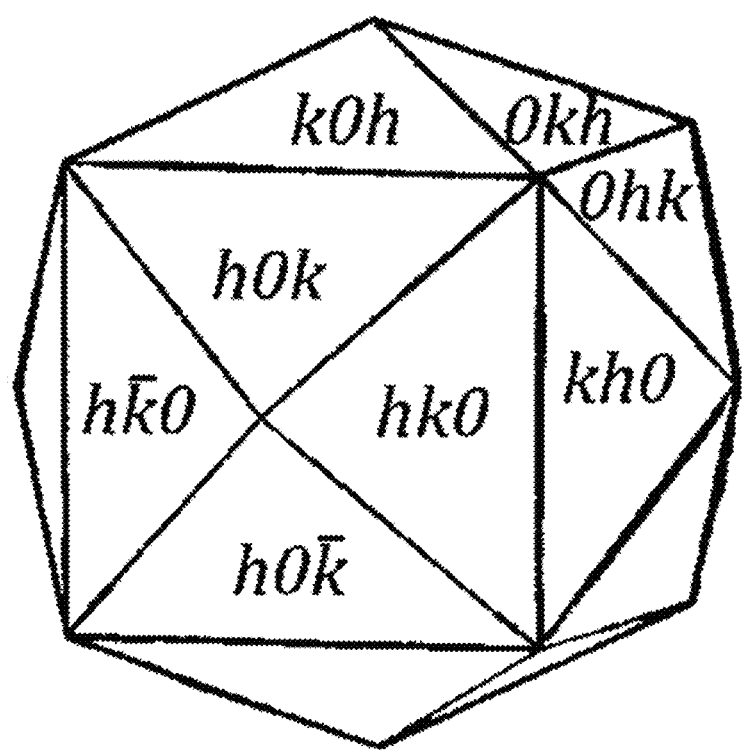
FIGS. 4A-4D show a model, TEM images and TEM diffraction of THH $PtNi_4$ NCs.

Well-defined Pt—Ni polyhedral NCs exhibit outstanding electro-catalytic activities, and the tendency to form segregated structures which are ideal templates for generating nanoframes [6]. Pt—Ni NCs with a THH morphology are terminated with 24 isosceles triangular high-indexed facets as illustrated in FIG. 4A, were selected as the "precursors". A robust synthesis approach [11] is provided to harvest size-controlled $PtNi_4$ THH NCs. The obtained Pt—Ni NCs feature a segregated atomic distribution, in which Pt atoms are concentrated at the edges and corners while Ni atoms are centralized in the interior, forming "Pt-rich frameworks" filled with Ni.

A high-angle annular dark-field scanning transmission electron microscopic (HAADF-STEM) image (FIG. 1A) and a bright-field transmission electron microscopic (TEM) image (FIG. 4B) show an average size of ~22 nm in projection "diameter" of the as-synthesized THH NCs. As discerned from three representative NCs circled in the HAADF-STEM image (FIG. 4C), the projection profiles of these THH NCs closely resemble those of ideal THH models with different orientations. A high-resolution TEM (HR-TEM) image of a single Pt—Ni THH NC was recorded along the <001> zone axis (FIG. 1E), and this projection orientation is confirmed by the corresponding Fourier transform (FT) pattern of a square symmetry (FIG. 4D). The average values of projection angles, a and $\beta$, are determined as 133.6(5°) and 136.3(5°) from a series of measurements marked on the HRTEM image (FIG. 1F). According to the projection angle formula a=2 arctan(h/k) [13], the average value of h/k can be calculated as 2.3360±0.0135≈7/3 and the Miller indices of the surface planes are therefore deduced as {730} [10,14] (also refer to the theoretical angles in FIGS. 5A and 5B). The indexation of the exposed facets can be corroborated from the atomic arrangement, in which {310} and {210} sub-facets periodically stack up, as delineated in FIG. 1F. It should be noted that the edges of the THH NCs present different Z-contrast compared with the interior (FIG. 1A and FIG. 4C), inferring a non-uniform compositional distribution from the edges to the center as reported before [15]. This characteristic is also reflected in the XRD pattern (FIG. 1G). The aslant peak shoulders marked by the arrows suggest the underlying segregation of components (as opposed to a core-shell structure) [16], which agrees with a recent report [17]. Energy-dispersive X-ray spectroscopy (EDX) analysis, as presented in FIGS. 6A and 6B, confirms that in a THH NC more Pt atoms are distributed at the edge and corners, whereas more Ni atoms are segregated in the center. The global Pt/Ni atomic ratio is 1:4 as assessed by inductively coupled plasma-optical emission spectrometry (ICP-OES) (Table 1).

The $PtNi_4$ THH NCs can be transformed into $Pt_3Ni$ THH nanoframes by selectively removing Ni through a process corresponding to the Mond process, i.e., thermal annealing under a CO atmosphere [12] (Ludwig Mond demonstrated that element Ni could be extracted from its ores above 50° C. by CO that acts as both the complex ligand and reducing agent to form a gaseous compound, $Ni(CO)_4$, which is stable up to 230° C. Above 230° C., Ni and CO can be recovered again from the decomposition $Ni(CO)_4$.)).

HAADF-STEM EDX elemental mapping and imaging on a CO-etched nanoframe yielded via CO-annealing of a $Pt_3Ni$ THH nanoframe at 170° C. for 45 minutes in the zone axis of <001>, a Pt-rich hollow structure with the THH profile is observed. The abundance of Pt in the proximity of rims and corners can be clearly seen. The detection of Ni signals outside the nanoframes indicates the extraction of Ni is through the formation and removal of the volatile $Ni(CO)_4$ complexes. Pt-rich rims and apexes can be further verified by HAADF-STEM EDX line scan profiles obtained along the <001> zone axis. Compositional analyses on these THH nanoframes from different orientations reveals that the CO-etching time controls the extent of de-alloying and the EDX data acquired at different positions along the <001> zone axis on a selected THH nanoframe etched for 45 minutes show an average Pt/Ni molar ratio of ~3:1 (Table 2).

Figure 8:
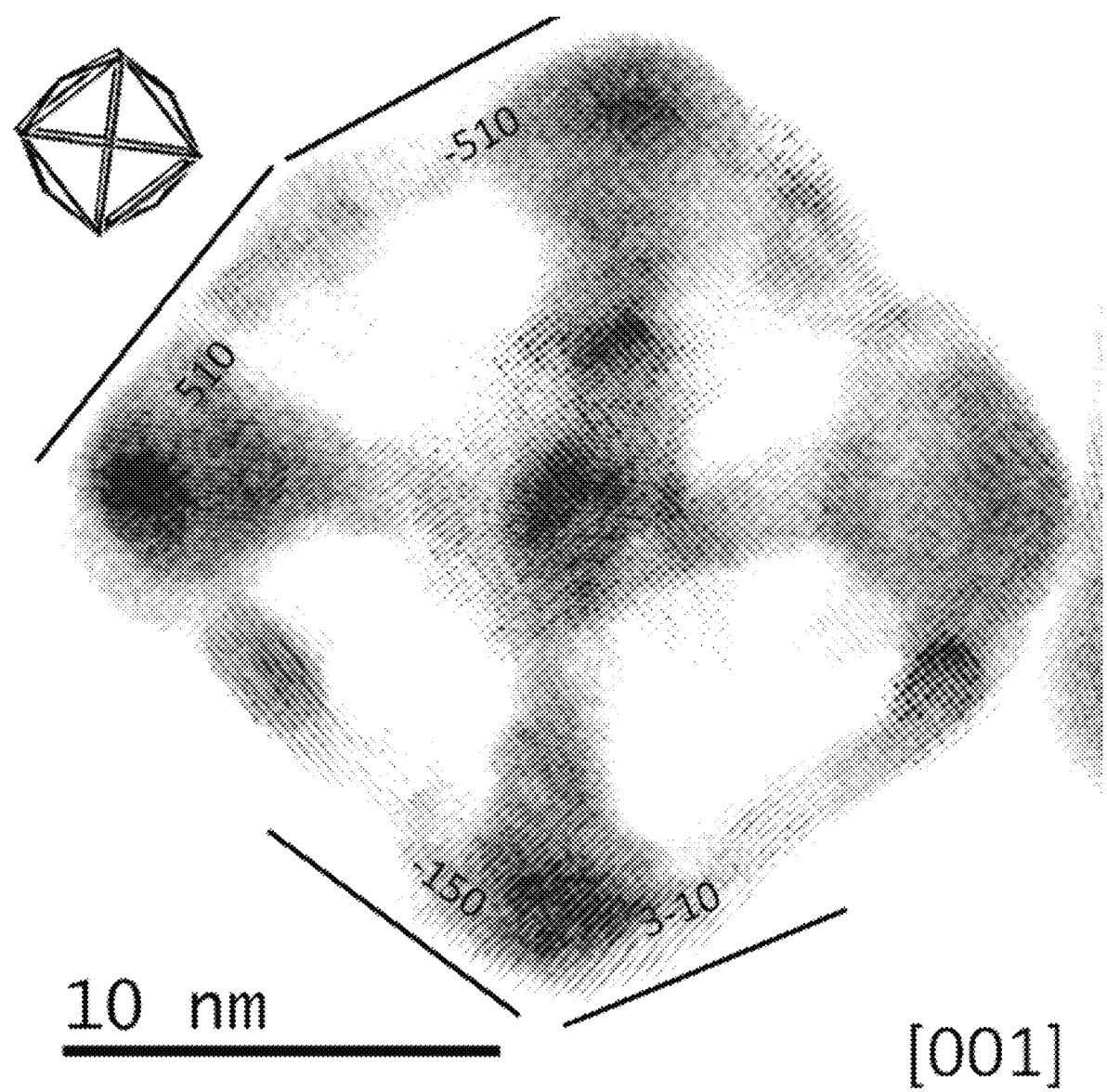
FIG. 8 shows the determination of external facet of a $Pt_3Ni$ THH nanoframe along a zone axis of <001>.

Unlike most of the etched NCs with deformed morphologies, the overall THH profile and exposed high-indexed facets in the Pt—Ni NCs are retained despite that significant amounts of Ni are removed. As shown in FIG. 2B and FIG. 8, a series of {hk0} facets including {510} as well as {310}, {410} and {720} can be clearly identified, indicating the presence of high-indexed facets in these THH nanoframes. It should be noted that the surface of these hollow nano-architectures is quite smooth, distinctly different from those rough surfaces with dangling bonds produced via solution etching. Such a feature is essential to maintaining the surface stability and averting further Ni leaching in the acidic/corrosive catalytic environment. Close inspection of the outermost {200} lattice (segregated with Pt) of a solid THH NC (FIG. 2A) and a THH nanoframe (FIG. 2B) reveals a shrinkage in lattice spacing, from 1.95 Å on the solid THH NC (FIG. 2C) to 1.92 Å on the nanoframe (FIG. 2D). Both values are slightly less than that of Pt{200}, suggesting that the segregated Pt thin shell is strained to the Pt—Ni alloy core. The difference in lattice contraction between solid and hollow THH NCs likely arises from the decrease of coordinating atoms for those segregated Pt atoms on Pt—Ni nanoframes due to the loss of Ni. Such compressive strains would result in a down-shift of the d-band center (relative to the Fermi level), and potentially provide NCs with unique catalytic properties, based on changes in the surface binding strength.

Generally, annealing would result in the formation of thermodynamically stable structures. However, in this case, the high indexed facets are preserved. To monitor the "etching" process, controlled experiments were conducted by shortening the annealing time. The NC intermediates with shallow voids on the surfaces were observed. Comparison of an intermediate (FIG. 2E-2H) with an original THH NC (FIG. 2I-2L) shows that a cuboid Ni profile was left behind in the center after the surface Ni atoms were etched away, which suggests preferential removal of Ni from the <100> direction. For the rims and edges where most Pt are found, the preservation of high-indexed facets can be attributed to the preferential segregation of Ni on the outmost layer of the Pt—Ni alloys in certain orientations [20,21]. The bulk Ni atoms are driven to the top layer continuously until a more stable hierarchical microstructure with a thin layer of Pt on top of the Pt—Ni high-indexed frames is formed. Meanwhile, the mild annealing temperature (<200° C.) also helps to release the stress caused by the extraction of Ni.

Figure 2A:
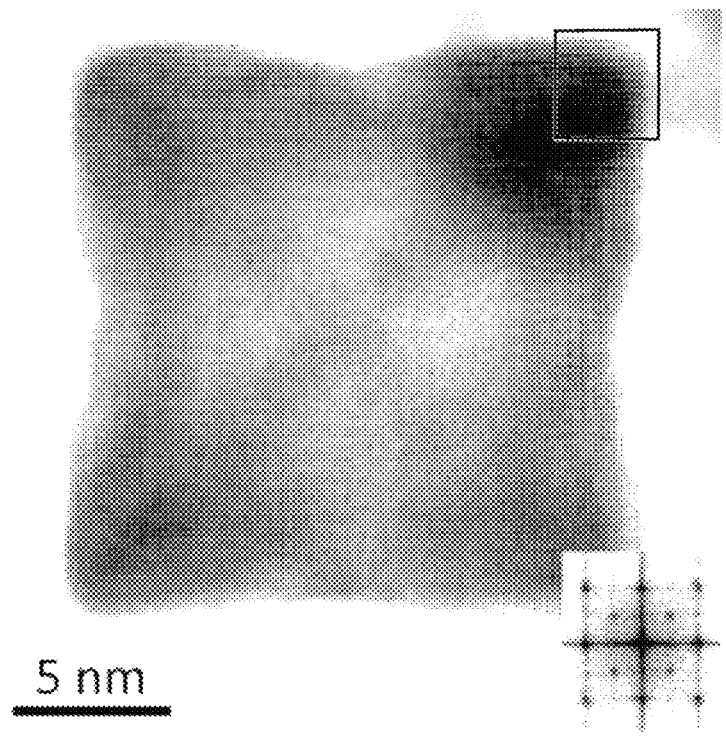
FIGS. 2A-2L show HAADF-STEM images and EDX elemental mapping results in zone axis of <100>.
Figure 2B:
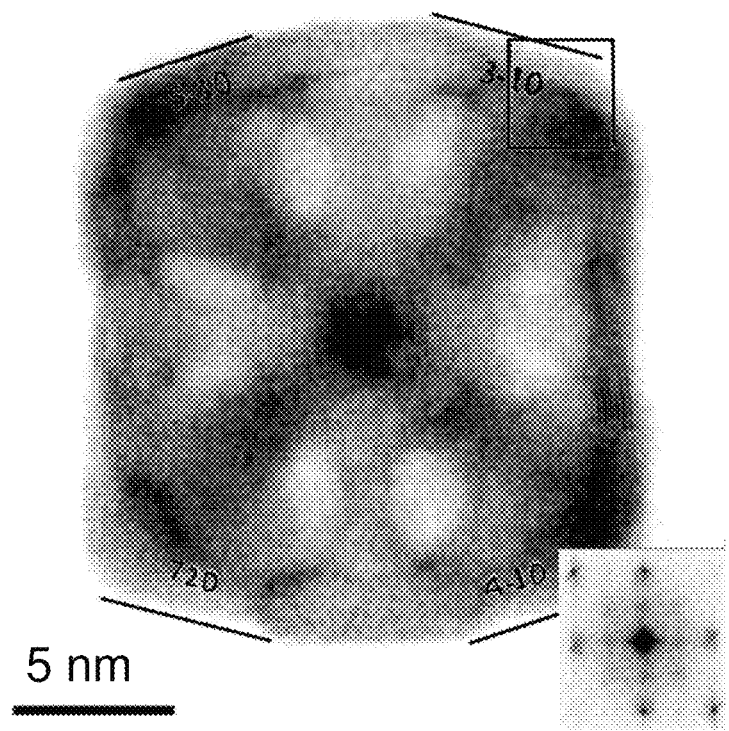
Figure 2C:
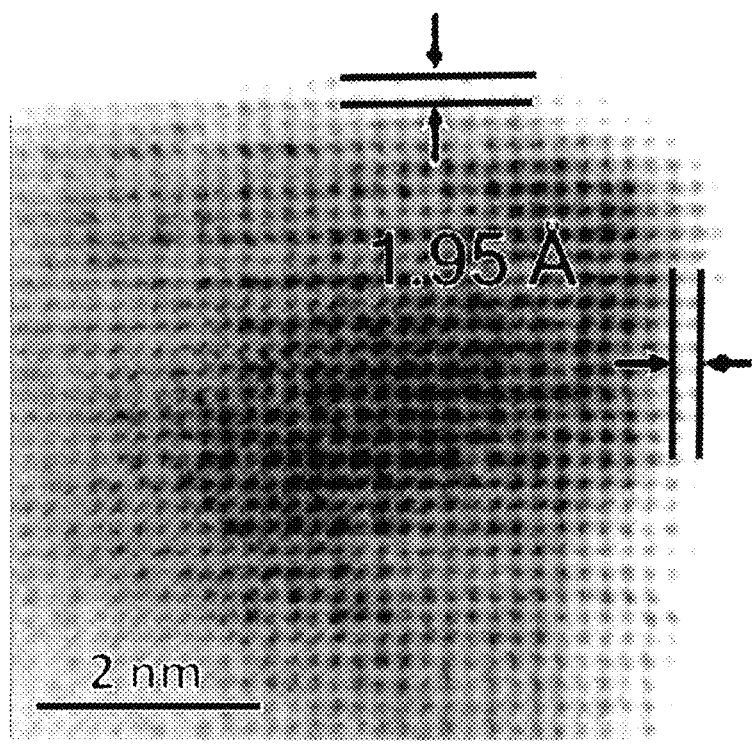
Figure 2D:
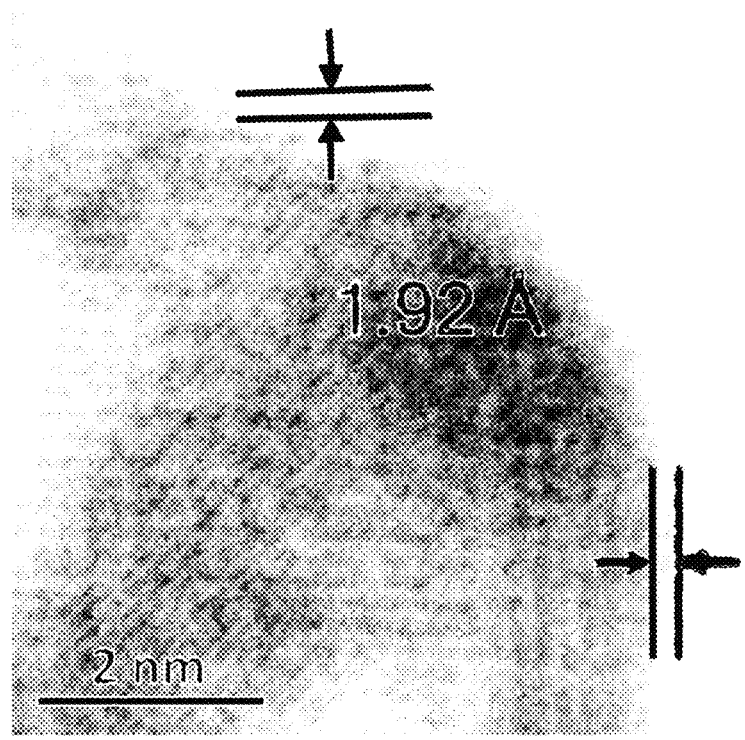
Figures 2E, 2F:
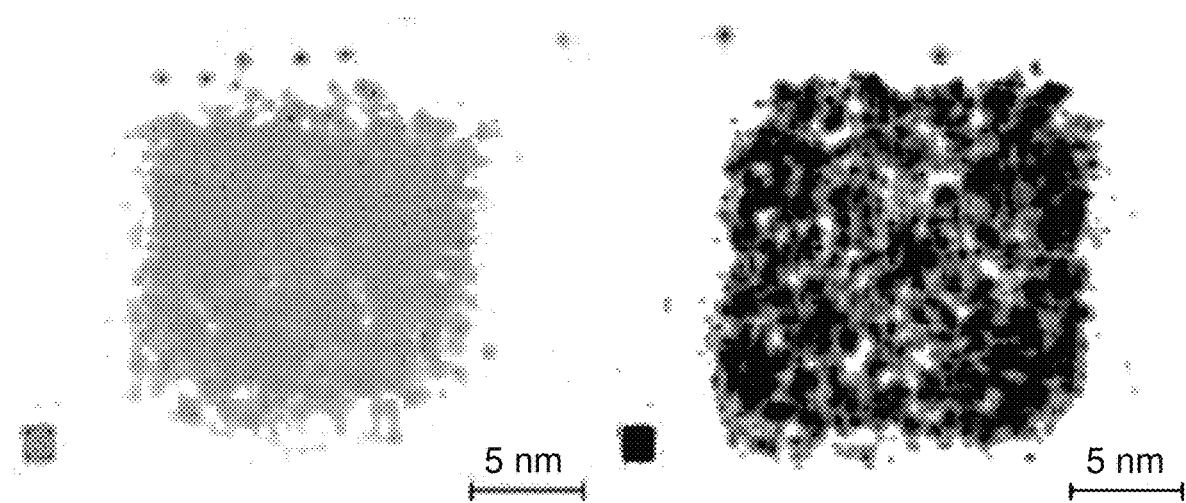
Figures 2G, 2H:
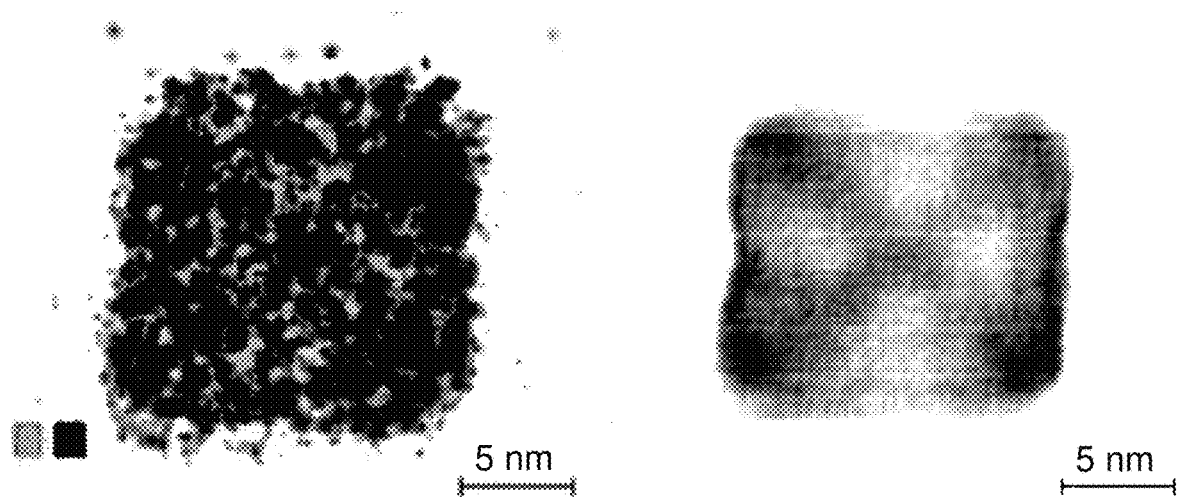
Figures 2I, 2J:
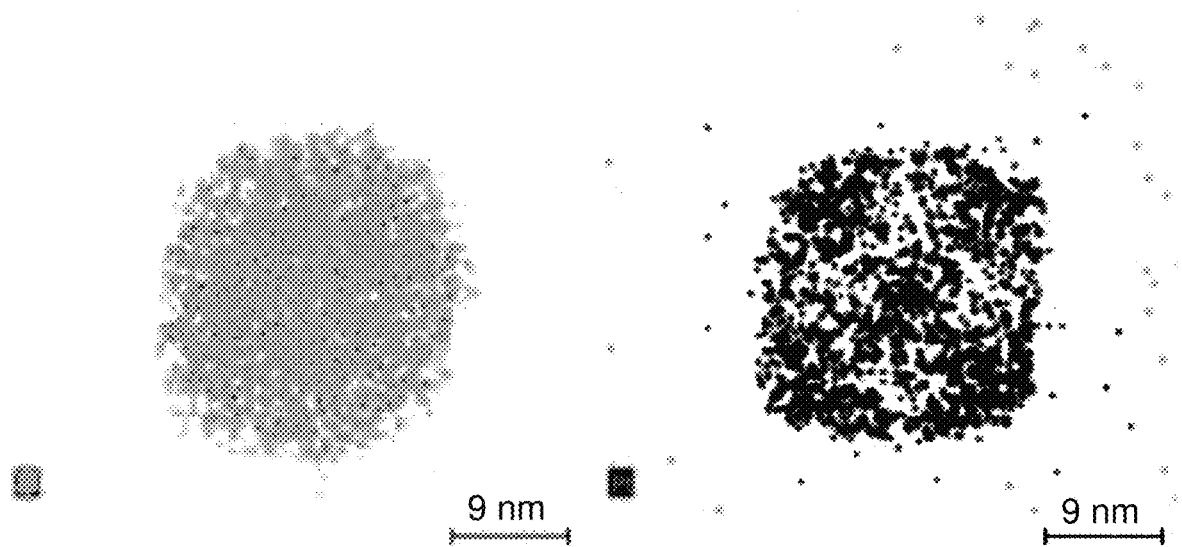
Figures 2K, 2L:
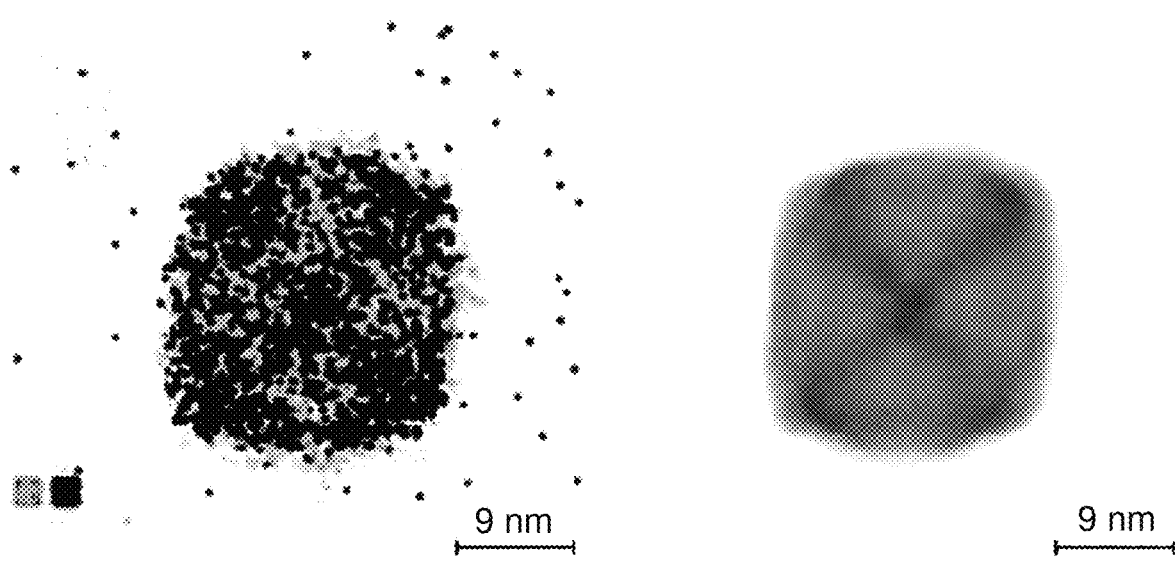

FIGS. 2A-2L show HAADF-STEM images and EDX elemental mapping results in zone axis of the <100>. FIGS. 2A-2D show HAADF-STEM images of a THH NC and THH nanoframe generated from CO-etching at 170° C. for 45 minutes. FIG. 2A shows THH NC; FIG. 2B shows THH nanoframe yielded via CO-etching. Insets in FIGS. 2A and 2B are FFT patterns of their whole images, respectively, confirming the <100> projection orientation. FIGS. 2C and 2D are zoom-in areas illustrated in FIGS. 2A and 2B, respectively, with average results of the measured {200} lattice fringes. FIGS. 2E-2L show comparative HAADF-STEM EDX elemental mapping results in the zone axis of <001>. FIGS. 2E-2G and 2I-2K show HAADF-STEM EDX elemental mapping images. FIGS. 2H and 2L show HAADF-STEM images of solid THH NCs; FIGS. 2E-2H show the nanoframe resulted from a partial CO-etching process. FIGS. 2I-2L show $PtNi_4$ THH NC (before the Ni-extraction).

For electrocatalytic applications, metal NCs are traditionally supported on high surface area carbon blacks to help disburse the particles. It is known from the fuel cell research that the carbon support can be oxidized to release CO and $CO_2$ at elevated temperatures, especially in the presence of Pt [22,23]. We further explore the possibility of using CO generated from the partial oxidation of the carbon support to etch away the Ni from $PtNi_4$ THH NCs in one-step annealing. The carbon supported solid $PtNi_4$ THH NCs was annealed at 185° C. in air followed by further annealing at 300° C. in 4% $H_2/N_2$ (denoted as "air-annealing process"). The second annealing step is to ensure the reduction of metal oxides that may be generated in this process. Supported metal catalysts commonly undergo a similar thermal annealing procedure [3,24]. However, in the present case, the carbon black serves as both the support and the CO source.

The etching mechanism in the "air-annealing" process appears to be similar to that for NCs annealed in pure CO, as confirmed by the detection of Ni on the carbon support (FIGS. 9A-9D), though the process does not generally result in open frames under other gases.

These hollow nanostructures with well-defined surface planes and engineered microstructures are ideal for studying the structure-property dependence. The $Pt_3Ni$ THH nanoframes show superior catalytic activity to the commercial Pt/C (HiSpec 4000, 40 wt % Pt). As shown in the cyclic voltammograms (CVs) in FIG. 3A, on $Pt_3Ni$ THH, nanoframes the formic acid oxidation current density (normalized to Pt area) in the anodic scan (from negative to positive potentials) is very close to the cathodic scan, in stark contrast to Pt/C where the anodic scan current density is much lower than the cathodic scan. At 0.40 V, the cathodic to anodic scan current ratio is 1.7 on $Pt_3Ni$ THH nanoframes, but 9.1 on Pt/C, suggesting that the $Pt_3Ni$ THH nanoframe is much less vulnerable to surface poisoning. This conclusion is confirmed by the transient current density recorded at 0.30 V vs RHE in FIG. 3B. The current density of $Pt_3Ni$ THH nanoframe is much higher than Pt/C for the entire time. For example, at 60 s, the activity of $Pt_3Ni$ THH nanoframe is 4 times of Pt/C.

Figure 3A:
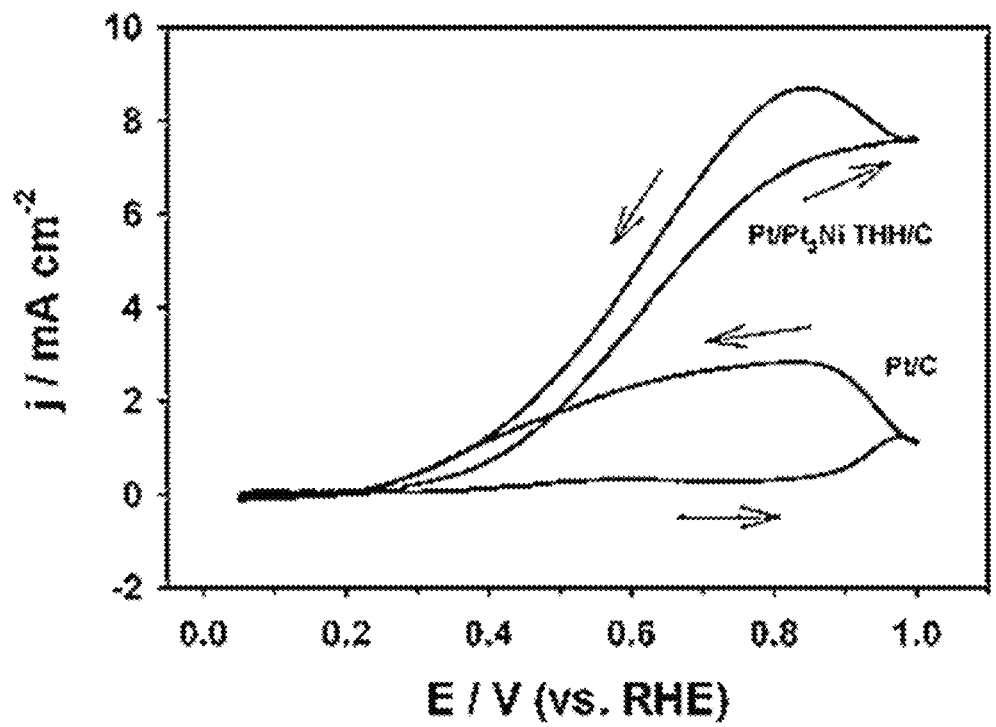
FIGS. 3A-3E show comparison of electrocatalytic activity per unit Pt surface area between $Pt_3Ni$ THH/C and Pt/C.
Figure 3B:
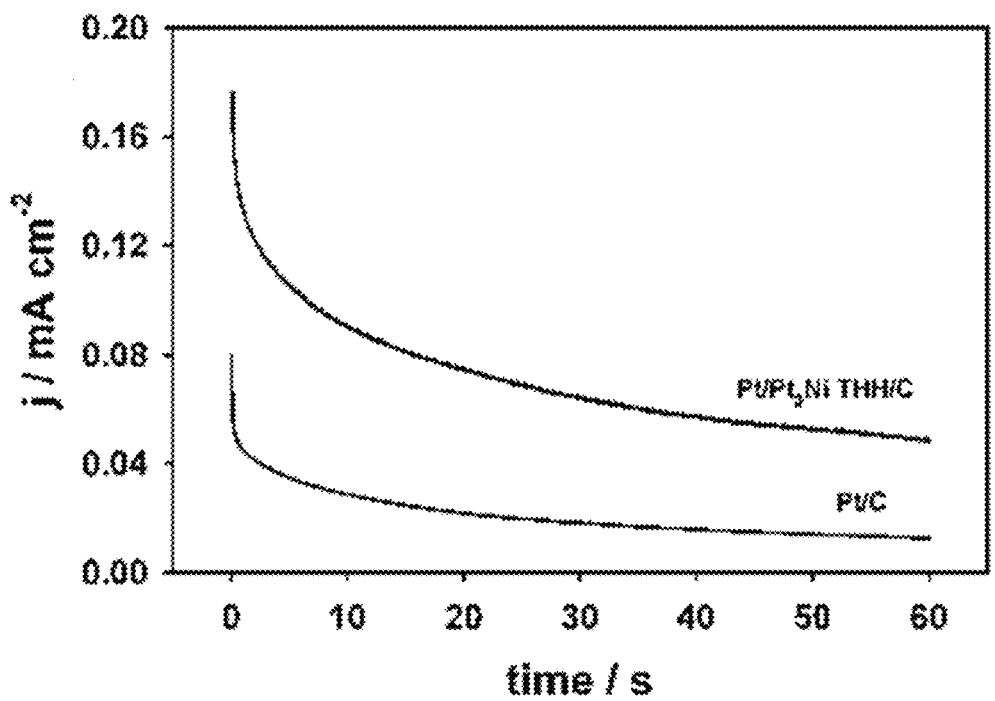
Figure 3C:
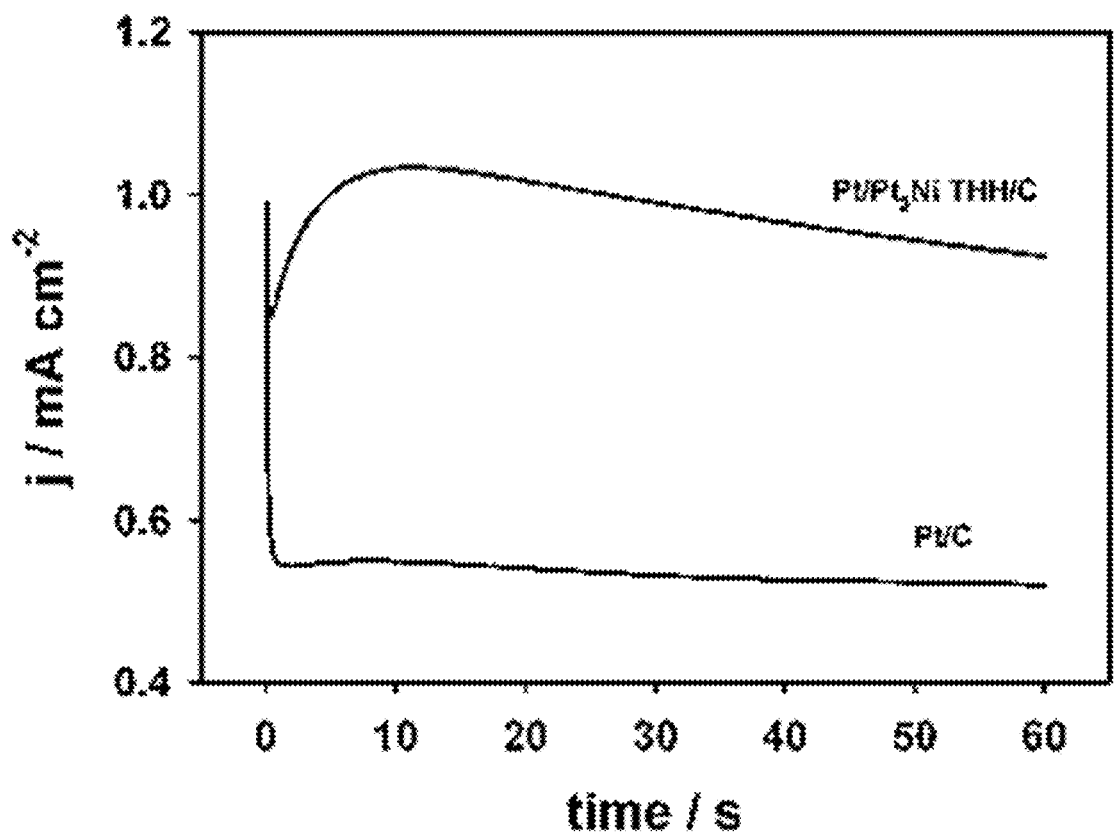
Figure 3D:
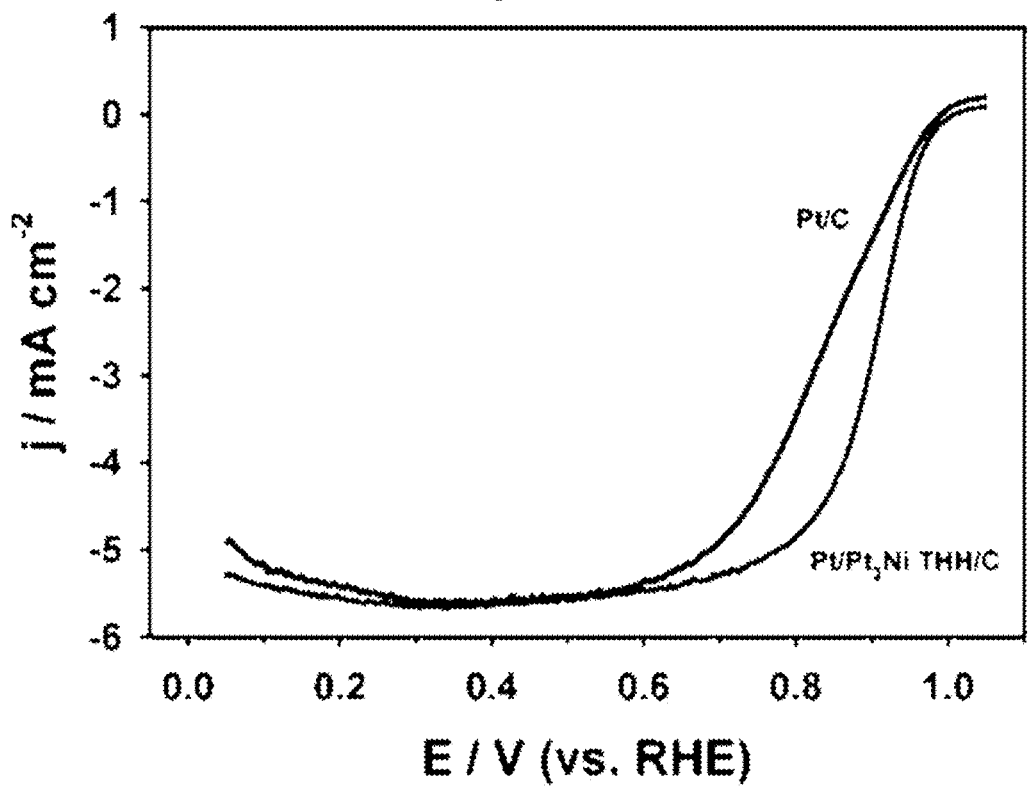
Figure 3E:
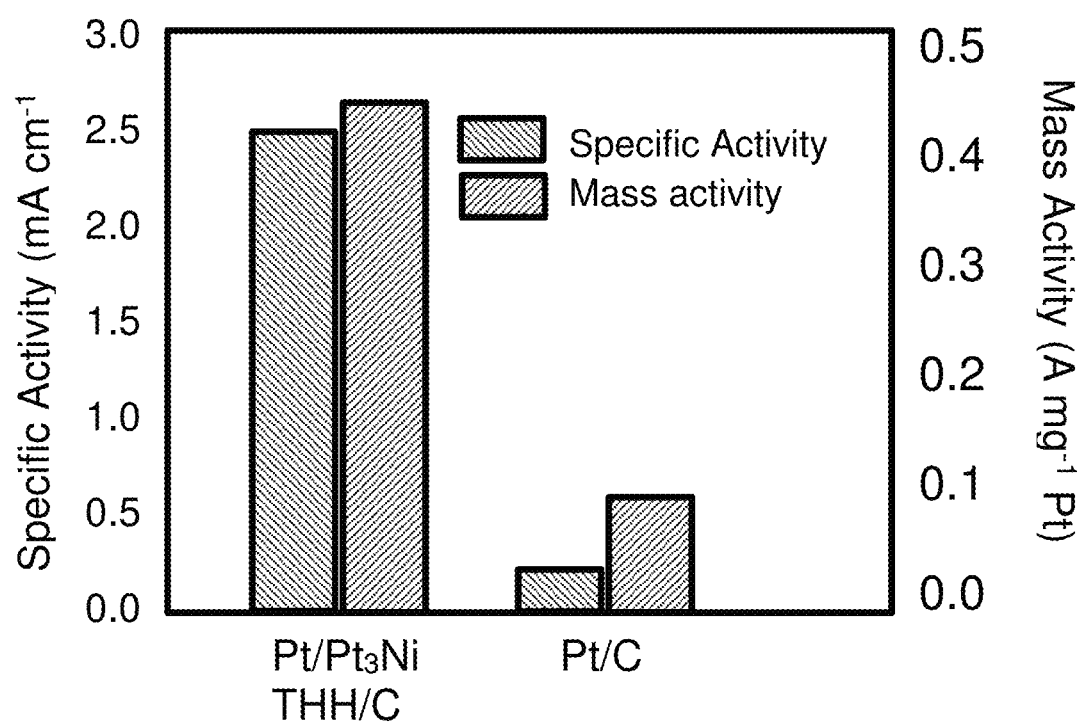

FIGS. 3A-3E show a comparison of electrocatalytic activity per unit Pt surface area between $Pt_3Ni$ THH/C and Pt/C. FIG. 3A shows CVs in 0.1 M $HClO_4$+0.5 M HCOOH at a scan rate of 0.1 $Vs^{-1}$. FIG. 3B shows current density-time curves recorded in the same solution at 0.30 V (vs. RHE). FIG. 3C shows current density-time curves recorded in 0.1 M $HClO_4$+1 M $CH_3OH$ at 0.75 V (vs RHE). FIG. 3D shows ORR polarization curves recorded in 02-saturated 0.1 M $HClO_4$ with a potential scan rate of 20 mV s−1 and an electrode rotation rate of 1600 rpm. FIG. 3E shows ORR activity comparison at 0.90 V vs RHE.

It is well known that the electro-oxidation of formic acid to $CO_2$ proceeds through the so-called dual-path reaction mechanism: a "direct" route involving two dehydrogenation steps of formic acid to $CO_2$ and an "indirect" way associated with the formation of $CO_{ad}$ acting as a surface blocking species at potentials relevant to fuel cell applications [25, 26]. The improved formic acid oxidation activity may be attributed to the less binding strength of reactants on the Pt-skin layer. The Pt—Pt distance is about 2% smaller than the pure Pt. This compressive strain decreases the Pt d-band center, and therefore weakens the adsorption of species on the surface [27,28]. The effect of the compressive strain on the catalytic activity is further manifested in other reactions of significance to fuel cell applications. $Pt_3Ni$ THH nanoframes have enhanced CO electro-oxidation, which contributes to the 180% improvement of methanol oxidation observed on $Pt_3Ni$ THH nanoframes over Pt/C at 60 s (FIG. 3C). It has been well documented on other PtNi systems that the compressive strain lowers the oxygen binding energy and increases the oxygen reduction reaction (ORR) activity [6,29,30]. The $Pt_3Ni$ THH nanoframes also exhibit significantly improved ORR activity: the specific activity normalized to the Pt surface area is more than 10 times higher than the Pt/C and the mass activity shows a nearly 5 times improvement (FIG. 3D).

The $Pt_3Ni$ THH/C nanoframes are stable in catalytic environments. HAADF-STEM images and HAADF-STEM EDX elemental mapping on several nanoframes that were collected after 5000 potential cycles between 0.6 and 1.0 V, demonstrate no apparent changes in both the morphology and composition. Based on an average of 50 point spectra acquired at different positions of several particles, a local Pt/Ni molar ratio of 3:1 (73.4/26.6≈3:1) was confirmed, demonstrating the high stability of such THH nanoframes in the acidic electrochemical environment. The highly stable nanoframe structures after the 5,000 electrochemical potential cycles.

The present technology provides a facile and robust approach to generate high-indexed $Pt_3Ni$ THH nanoframes via CO etching at elevated temperatures. The nanoframes feature well-defined high indexed exposed surfaces, whose formation is attributed to the preferential etching pathway and mild annealing temperature. Unlike solution-based etching, this developed protocol shortens the etching time and generates well-defined surface structures. The segregated compressively strained Pt thin layer on the outmost of rims and vertexes has a downshifted d-band center which is mainly responsible for the improved catalytic performance. The obtained nanoframes address some of the major challenges for advanced catalysts with high stability and activity. In addition, through the same reaction the nanoframes can be formed by annealing the carbon black supported precursor in the air, a common practice for preparing industrial nanocatalysts, which offers straightforward incorporation of the developed approach in the industry to engineer surface-structure controlled catalysts. It is foreseeable that this approach can be extended to other bimetallic systems for fabricating a variety of desirable and stable microstructures.

Characterization Methods:

X-ray diffraction patterns were collected using a PANalytical X'Pert X-ray powder diffractometer equipped with a Cu Kai radiation source ($\lambda$=0.15406 nm). Inductively coupled plasma-optical emission spectrometry (ICP-OES) and inductively coupled plasma-mass spectrometry (ICP-MS) analyses were carried out on an Optima 7000 DV ICP-OES spectrometer (PerkinElmer) and a Varian 825 (Agilent), respectively. TEM analysis: an FEI Tecnai Spirit operated at 120 kV was used for TEM imaging, JEOL2100F was used for collecting HRTEM images, Cs-corrected Hitachi 2700C with accelerating voltage of 200 kV was used for HAADF-STEM imaging as well as EDX mapping and line scan, and Hitachi HT7700 was used for imaging the structure of THH nanoframes after electrochemical potential cycles with ±30° tilt. Electrochemical studies were conducted using a CHI 700B analyzer (CH Instruments) with a two-compartment, three-electrode electrochemical cell.

$PtNi_4$ THH NC synthesis:

Monodisperse $PtNi_4$ THH NCs were prepared by co-reducing Pt(IV) and Ni(II) precursors in 1-octadecene(ODE) in the presence of oleylamine (OAm). In a typical synthesis, 15 mg of $PtCl_4$, 30 mg of $NiCl_2.6H_2O$, 3.0 mL of OAm and 5.0 mL of ODE were loaded into a three-neck flask equipped with a condenser and attached to a Schlenk line. After the mixture was heated to 110° C. with vigorous stirring under vacuum for removal of moisture, the system was switched to an argon line and maintained at this temperature for 10 minutes. The temperature of the system was then increased to 180° using a programmed temperature controller. During this process, the color of the solution gradually changed from green to yellow and finally brown (but still transparent) upon reaching 180° C. The mixture was maintained at 180° C. for additional 10 minutes, followed by direct elevation of the temperature to 290° C. within 5 minutes, wherein the transparent solution turned black with colloidal suspensions. Once the system reached 290° C., the crystal growth was terminated by quick removal of the heating mantle and a fast cooling of the flask to room temperature using a cold water bath. The resultant $PtNi_4$ THH NCs were isolated by adding a certain amount of anhydrous ethanol followed by centrifugation and re-dispersion in hexane for several cycles. The products were finally dispersed in chloroform as stock suspensions.

Cleaning, Carbon loading, CO-Etching and Annealing Treatments of the Synthesized THH NCs/C:

The as-synthesized THH NCs were thoroughly cleaned by loading the suspensions into a flask containing a mixture of chloroform, hexane, and ethanol, refluxing for a given time and centrifugation. Such a cleaning process may be repeated until no obvious organic components could be observed by TEM.

A given amount of carbon black (Vulcan xc72) was loaded in a glass vial in the presence of hexane and subjected to ultrasonication for 120 minutes for complete dispersion. A desired amount of stock suspensions of the freshly cleaned $PtNi_4$ THH NCs in hexane was then gradually introduced into this vial and subjected to ultra-sonication for additional 120 minutes, followed by magnetic stirring for more than 480 minutes.

The obtained $PtNi_4$ THH NCs supported on carbon black (50%/50% in wt) were isolated from the solution by centrifugation and re-dispersed in ethanol to form a suspension aided with ultra-sonication for 5 minutes. In the CO-annealing process, such a suspension of $PtNi_4$ THH NCs/C was subsequently drop-cast on to a TEM grid coated with an ultrathin carbon support film (Ted Pella 01824G) and carefully loaded into the center of the heating zone in a tube furnace to de-alloy Ni at 170° C. for 30, 45 and 90 minutes, respectively, in a CO stream freshly generated from an in-situ reaction between formic acid and sulfuric acid [31]. The furnace system was pre-flushed by a CO-stream for 20 minutes before the etching process. (CO and nickel carbonyl are extremely poisonous, and due care was employed).

In the "air-annealing process", the carbon-supported $PtNi_4$ THH NCs collected by centrifugation were dried in a vacuum oven. A fine alumina crucible containing $PtNi_4$ THH NC/C powder was laid at the center of the heating zone in a tube furnace (Lindberg) with the crucible mouth facing the direction of the incoming gas stream. The sample was annealed in the residual air in the furnace at 185° C. for 45 minutes (no air stream was provided) and followed by annealing in an $H_2/N_2$ stream (4% $H_2$) at 300° C. for additional 45 minutes to reduce the possible metal oxides formed in this process.

Electro-catalytic Characterization:

$Pt_3Ni$ THH nanoframes and commercial Pt/C catalysts were dispersed with ethanol and 0.5 wt % Nafion to form stable ink solutions, respectively. An Ag/AgCl electrode saturated with KCl was used as the reference electrode and a Pt wire as the counter electrode. The potential, however, was converted to the reversible hydrogen electrode (RHE). To prepare a catalyst-coated glassy carbon (GC) electrode, 12 µL of the aforementioned colloidal suspension was drop-cast on a polished GC and dried in the air. The electrode potential was cycled between 0.05 and 1.00 V with a scan rate of 0.1 $Vs^{-1}$ in 0.1 M $HClO_4$ until a steady voltammogram was obtained. The electrochemical activity measurement for formic acid oxidation reaction was performed in 0.1 M $HClO_4$+0.5 M HCOOH. In the CO stripping characterization, CO gas was bubbled through the electrolyte solution for 5 minutes while the electrode potential was held at 0.1 V. CO dissolved in the electrolyte solution was then removed by purging nitrogen through the solution for at least 15 minutes. The electrochemical surface area was estimated from the charges of the oxidation of a saturated CO adlayer on particle surfaces, assuming 420

μC/cm² for complete removal of one monolayer CO. All of the electrochemical tests were carried out at the room temperature.

Figure 4B:
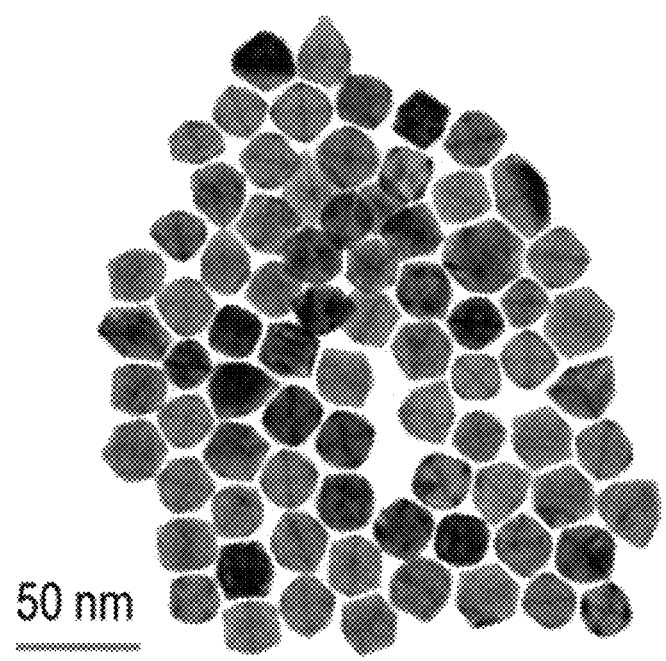
Figure 4C:
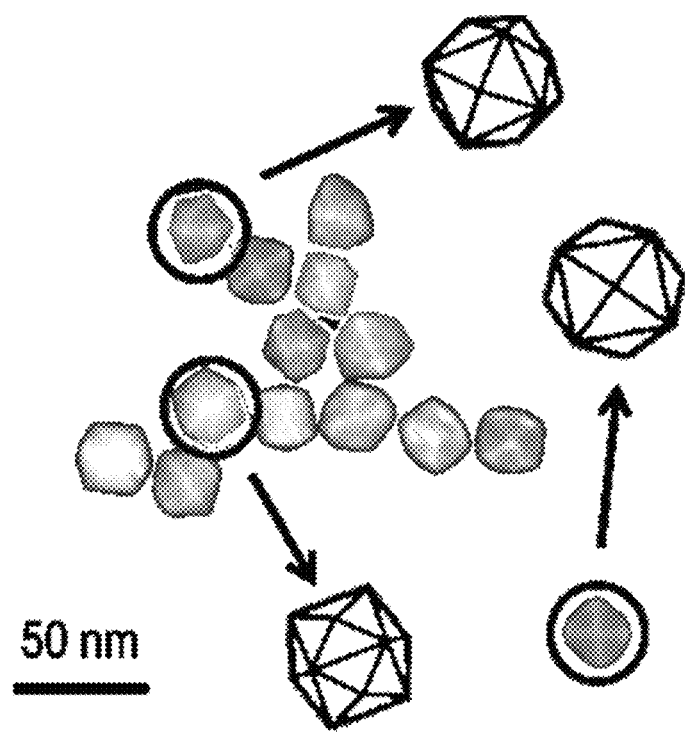
Figure 4D:
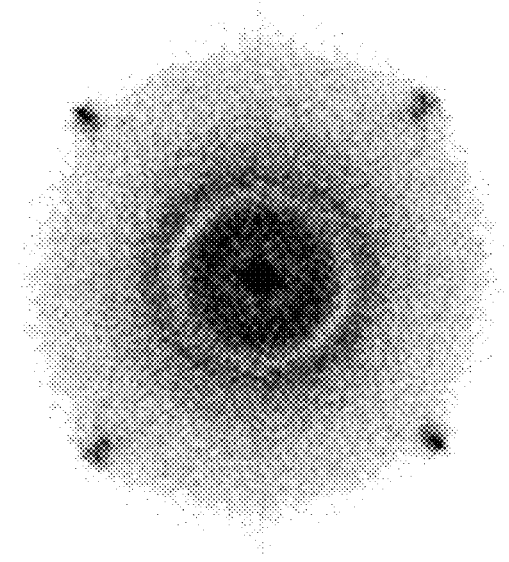

Results and Discussion:

FIGS. 4A-4D show a model and images of THH PtNi$_4$ NCs. FIG. 4A shows a geometrical model of an ideal THH NC with high-index facets. FIG. 4B shows a bright-field TEM image of PtNi$_4$ THH NCs. FIG. 4C shows a HAADF-STEM image of THH PtNi$_4$ NCs with three circled particles corresponding to the three schematic models of typical orientations. FIG. 4D shows an FFT pattern with a square symmetry corresponding to the selected NC in FIG. 1E, confirming the <001> Projection Orientation.

The THH polyhedron in FIGS. 4A-4D is terminated with 24 isosceles triangular high-index facets with vicinal planes. It can be visualized as a cube with 4 equal-sized triangular faces raised from the center of each cube face. As shown in FIG. 4A, the bases of these triangular faces from the edges of the cube and the apexes meet at the 4-fold axis. Due to the variation of inclination to this axis, a THH polyhedron could be bounded by different sets of exclusive high-index crystallographic facets, [14] but all of them can be expressed by a general notation of {hk0} (h>k >0) [47]. A robust synthesis approach [1 1] was developed to harvest size- and facet-controlled bimetallic PtNi$_4$ THH NCs with a peculiar atomic distribution, in which Pt atoms are segregated at the edges and corners, while Ni atoms are evenly distributed on the surface and interior, forming "Pt-rich frameworks" filled with Ni (FIG. 4B). These THH NCs were evolved by co-reducing Pt(IV) and Ni(II) precursors in 1-octadecene in the presence of olaylamine acting as both a reducing and a capping agent.

Figures 5A, 5B:
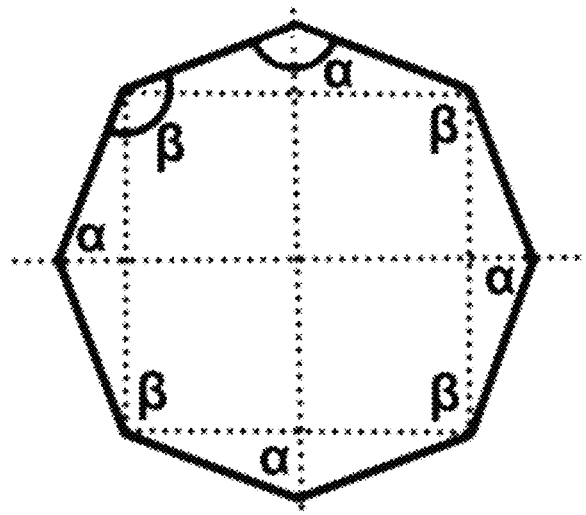
FIGS. 5A and 5B show a graphic relationship (5A) and numeric chart (5B) of the relationship between the projection angles and surface miller indices of a THH NC model projected along <001>.

FIGS. 5A and 5B show the relationship between the projection angles and surface miller indices of a Pt—Ni THH NC projected along <001>[47, 49].

Figures 6A, 6B:
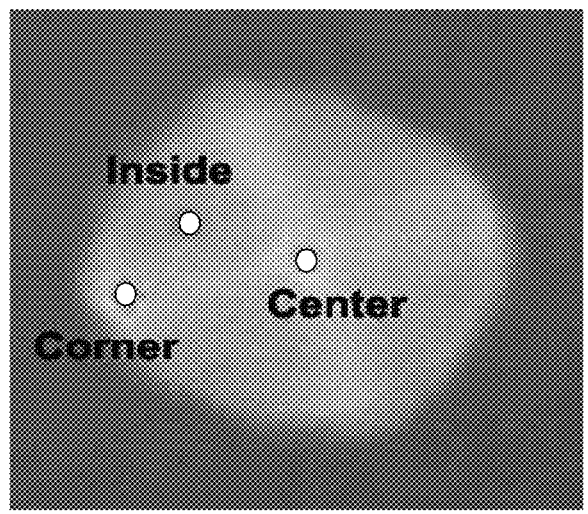
FIGS. 6A and 6B show an annotated photomicrograph relationship (6A) and a numeric chart (6B) of HAADF-STEM EDX analyses at different positions on a Pt—Ni THH NC before the thermal annealing, indicating the local distribution of Pt/Ni compositions, along projected zone axis <001>.

FIGS. 6A and 6B show HAADF-STEM EDX analyses at different positions on a Pt—Ni THH NC before the thermal annealing, indicating the local distribution of Pt/Ni compositions along projection zone axis <001>). The Pt atoms in the THH NCs are segregated not only at the top-most layer but also at the edges and vertexes, as evidenced by the HAADF-STEM energy-dispersive X-ray spectroscopy (EDX) line-scans along the selected directions across an entire particle. Such a line-scan along the <100> orientation, beginning and ending at the apexes of "pyramids", shows the overwhelming Ni signal over Pt. The intensity curve for Pt displays three distinct maxima on the edges and corners. The compositional profile for Ni shows a plateau in the central region of the NC and a "valley" at the middle vertex corresponding to the "acme" for Pt. The onset of the Pt signal appeared prior to that of Ni when the scanning probe approaches a vertex of the NC along the <100> direction, inferring that Pt atoms are aggregated at the salient points of the THH NC. Trajectories of scans in the <110> direction, following the diagonal of the pyramid from one salient corner to another, provide congruous structural information. A synopsis of the compositional ratio between Pt and Ni on the selected edges and corners of a THH NC is presented in FIGS. 6A and 6B, quantitatively showing their local variances. These results unanimously reach that the as-synthesized PtNi$_4$ THH NCs feature a Pt-rich cubic framework along with their edges and corners in a phase of PtNi$_3$, whereas the Ni atoms are preferentially segregated as a bulk filling in the voids, in coherence with the HAADF-STEM image.

Figure 7A:
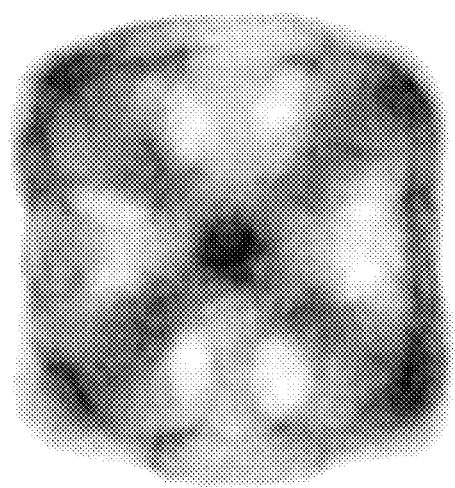
FIGS. 7A-7F show dark-field HRTEM images of the $Pt_3Ni$ THH nanoframes observed in different zone axes and treated using different contrasts.
Figure 7D:
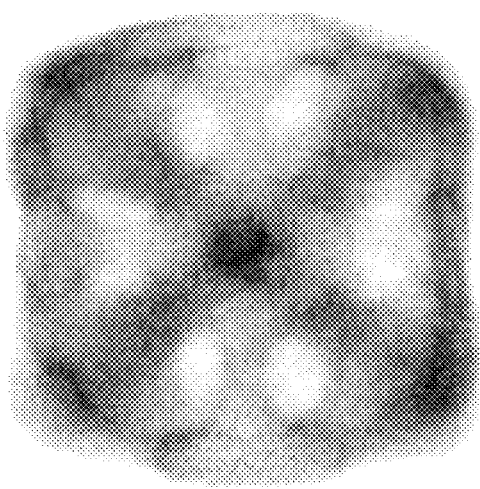
Figure 7B:
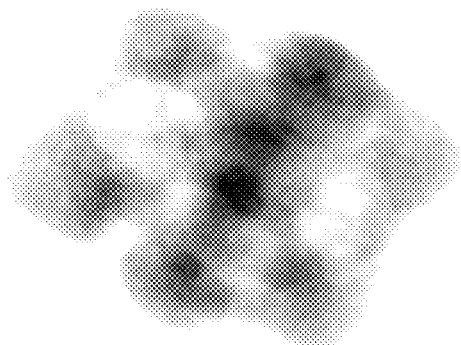
Figure 7E:
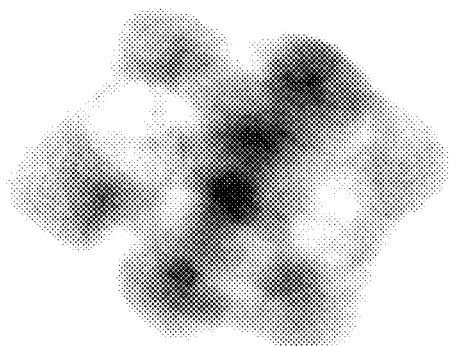
Figure 7C:
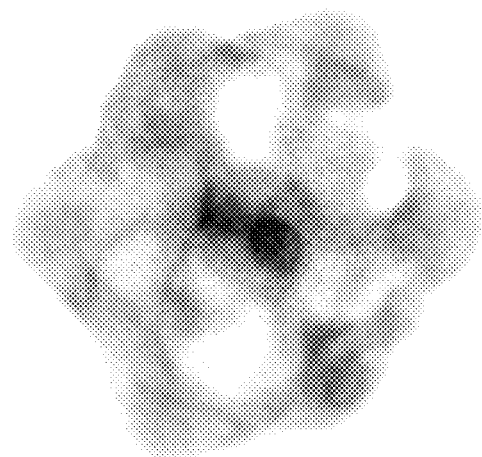
Figure 7F:
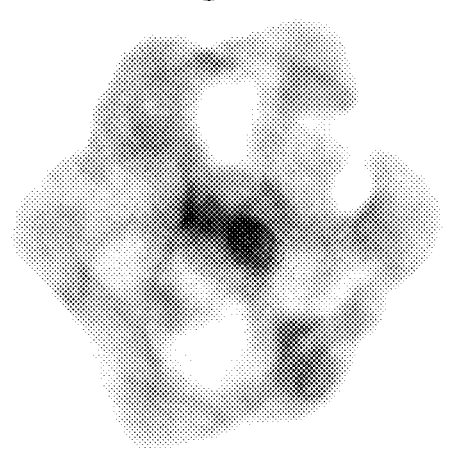

FIGS. 7A-7F show dark-filed HRTEM images of the Pt$_3$Ni THH nanoframes observed in different zone axes) and treated using different contrasts. FIGS. 7A and 7D show the zone axis of <100>. FIGS. 7B and 7E show the zone axis of <011>. FIGS. 7C and 7F show the zone axis of <111>. FIGS. 7A-7C show filtered images; and FIGS. 7D-7F show original images. The image in the zone axis of <001> can be found in FIG. 8.

FIG. 8 shows the determination of external facet of Pt$_3$Ni THH nanoframes in zone axis of <001>. The nanoframes were yielded via CO-annealing at 170° C. for 45 minutes from PtNi$_4$ THH NCs/C, and the analysis is conducted on a HAADF-STEM high-resolution image.

Figure 9A:
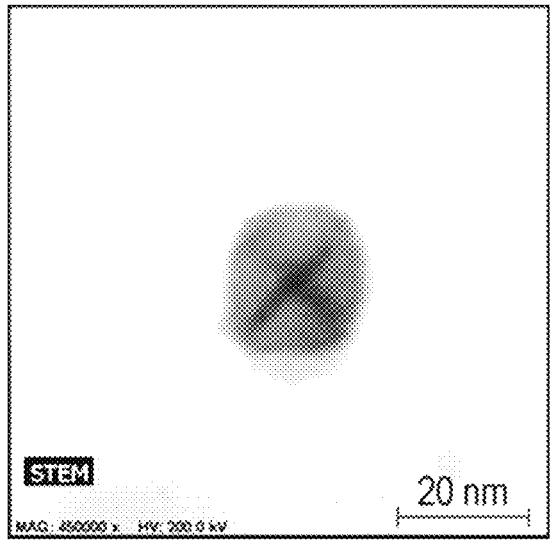
FIGS. 9A-9D show HAADF-STEM EDX mapping on a carbon-supported THH NC annealed in inert gases in the absence of CO or air, showing the absence of Ni extraction.
Figure 9C:
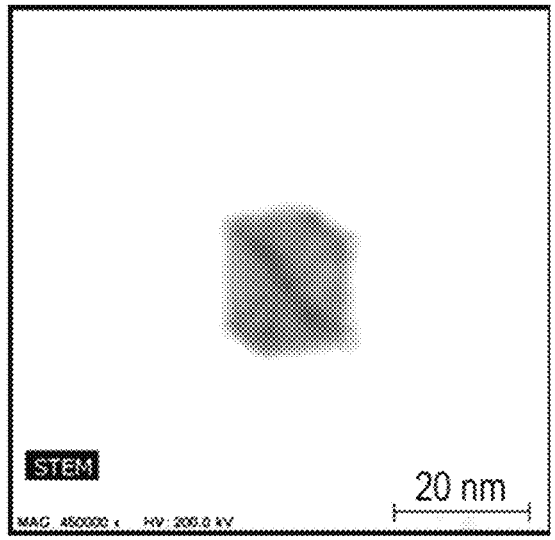
Figure 9B:
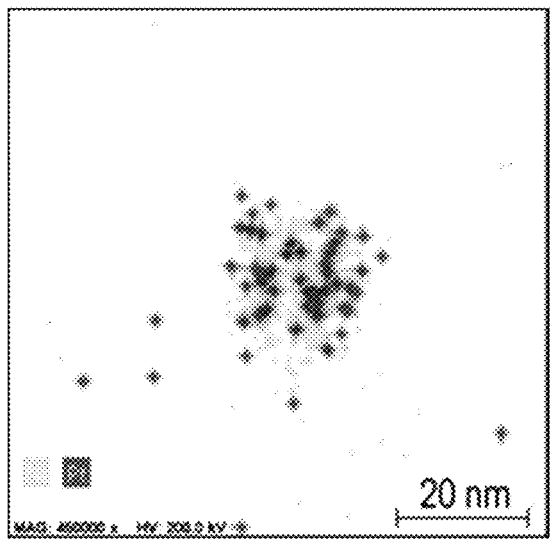
Figure 9D:
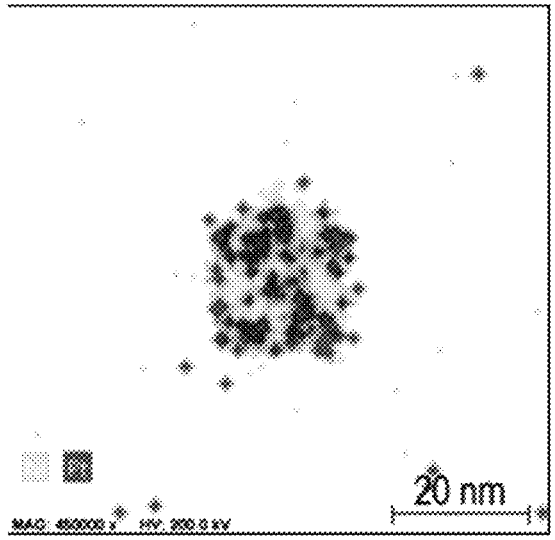

FIGS. 9A-9D show HAADF-STEM EDX mapping on carbon-supported THH NCs annealed in inert gases in the absence of CO or air, showing the absence of Ni extraction. FIGS. 9A and 9C show HAADF-STEM images of annealed NCs, showing no hollow structure formation. FIGS. 9B and 9D show HAADF-STEM EDX mapping on NCs in FIGS. 9A and 9C, respectively. The NC in FIGS. 9A and 9B were annealed in Ar, whereas that for FIGS. 9C and 9D in N$_2$ using the same heating temperature and time as the "air annealing process".

HAADF-STEM EDX elemental mapping on the hollow structure in the zone axis of <001> shows that the Pt-rich frame remains, whereas most of the Ni is removed after the annealing. The remaining Ni is most likely located inside the Pt frame. The local composition of the hollow THH NC was quantitatively determined as Pt$_3$Ni using HAADF-STEM EDX.

A comparison of mapping images in the <001> zone axis before and after partially CO-etched THH NCs indicates that de-alloying of Ni was initiated from the <100> direction (FIGS. 2E-2H). On the basis of the observation on cube-shaped voids in most well-developed Pt$_3$Ni THH nanoframes, it may be inferred that the Ni dissolution might have occurred along the <100> directions. To trace the transferred Ni contents, the sample grid was mapped using HAADF-STEM EDX. A considerable amount of Ni was found on the carbon substrates around the NCs, whereas no significant amount of Pt was found. In contrast, no Ni was found in the background when the carbon-supported THH NCs were annealed in pure Ar or N$_2$ (refer to FIGS. 9A-9D). The background mapping result confirms that the segregated Ni component was extracted from the THH NCs via the annealing process, transforming the initially Ni-rich THH NCs into Pt-rich nanoframes. This observation also explains why the Pt/Ni molar ratio of these nanoframes determined by EDX and ICP-MS are drastically different (3:1 from HAADF-STEM EDX (Table 2) vs. 1:3 ICP-MS (Table 1)).

Figure 10A:
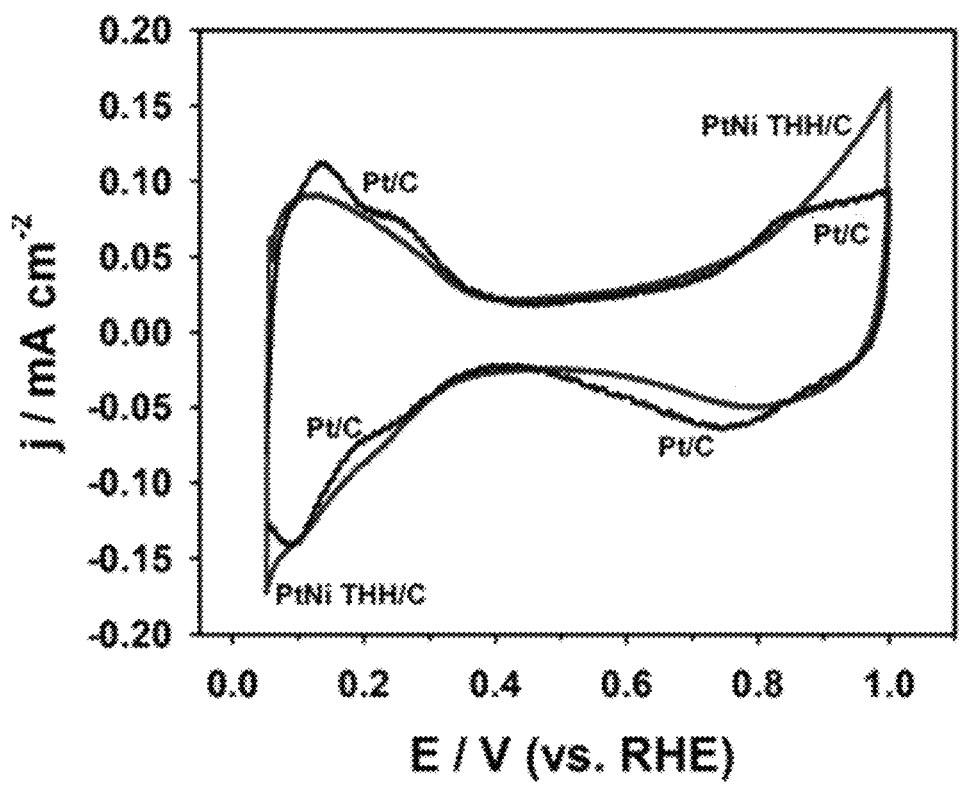
FIGS. 10A-10B show voltammograms of $Pt_3Ni$ THH nanoframes and commercial Pt/C in a potential scan rate of 0.1 $Vs^{-1}$ (10A, in 0.1M $HClO_4$; 10B, CO stripping voltammograms in the same solution).
Figure 10B:
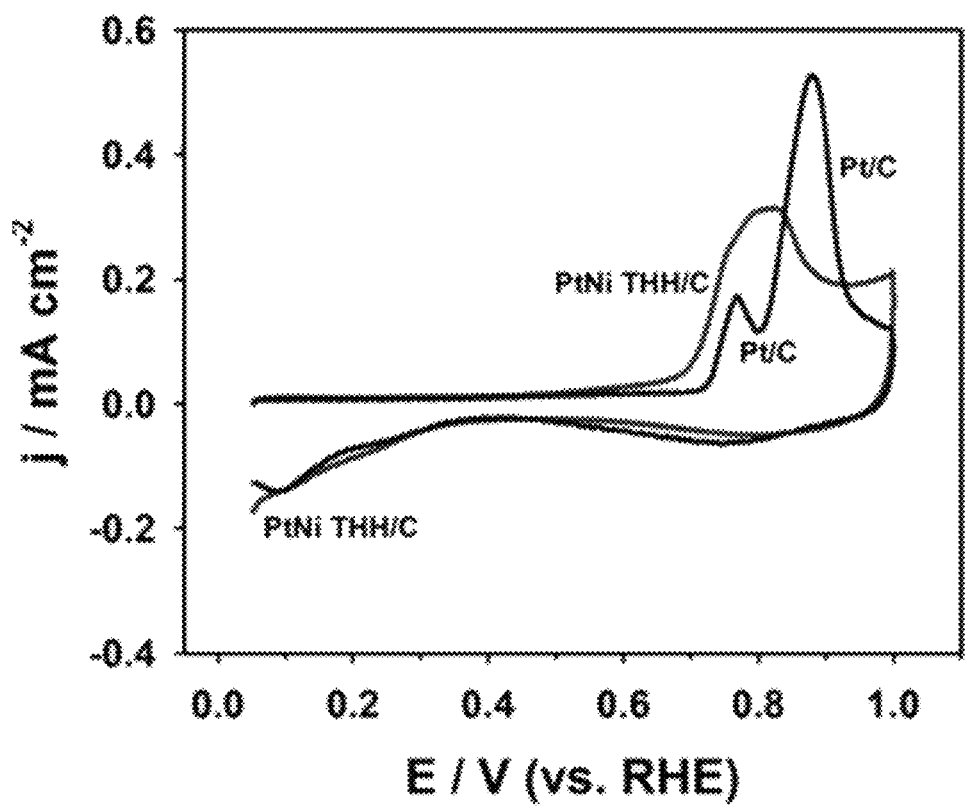

FIGS. 10A and 10B show voltammograms of Pt$_3$Ni THH nanoframes and commercial Pt/C. FIG. 10A shows cyclic voltammograms of Pt$_3$Ni THH nanoframes and Pt/C obtained in 0.1M HClO$_4$. FIG. 10B shows CO stripping voltammograms obtained on the corresponding surfaces in the same solution. Potential scan rate: 0.1 Vs$^{-1}$.

TABLE 1

ICP analysis results.

| Sample | | Concentration | | Molar Ratio | | Suggested Formula |
|---|---|---|---|---|---|---|
| | | Pt | Ni | Pt/Ni | $Pt_xNi_{(1-x)}$ | |
| Note: As-prepared from organic solution ICP-OES | Run 1 | 4.965 | 5.963 | 0.251 | $Pt_{0.20}Ni_{0.80}$ | $PtNi_4$ |
| | Run 2 | 3.033 | 3.650 | 0.250 | $Pt_{0.20}Ni_{0.80}$ | |
| | Run 3 | 2.380 | 2.852 | 0.251 | $Pt_{0.20}Ni_{0.80}$ | |
| | Run 4 | 1.683 | 2.003 | 0.253 | $Pt_{0.20}Ni_{0.80}$ | |
| | Average | (mg/L) | (mg/L) | 0.251 | $Pt_{0.20}Ni_{0.80}$ | |
| Note: After annealing as described ICP-MS | Run 1 | 94.065 | 78.146 | 0.362 | $Pt_{0.26}Ni_{0.74}$ | $PtNi_3$ |
| | Run 2 | 102.105 | 81.455 | 0.377 | $Pt_{0.27}Ni_{0.73}$ | |
| | Run 3 | 103.862 | 81.578 | 0.383 | $Pt_{0.28}Ni_{0.72}$ | |
| | Run 4 | 104.012 | 81.725 | 0.383 | $Pt_{0.28}Ni_{0.72}$ | |
| | Average | (ppb) | (ppb) | 0.376 | $Pt_{0.27}Ni_{0.73}$ | |

TABLE 2

HAADF-STEM EDX analysis data at different positions on a CO-annealed Pt—Ni THH nano frame in the zone axis of <001>

| Ni | Pt | Pt/Ni (at) (CO etching at 170° C. for 30 min) | Ni | Pt | Pt/Ni (at) (CO etching at 170° C. for 45 min) | Ni | Pt | Pt/Ni (at) (CO etching at 170° C. for 90 min) |
|---|---|---|---|---|---|---|---|---|
| corner | | 2:1 | corner | | 2:1 | corner | | 2:1 |
| 32 | 68 | | 34 | 66 | | 22 | 78 | |
| 33 | 67 | | 31 | 69 | | 31 | 69 | |
| 34 | 66 | | 33 | 67 | | 22 | 78 | |
| 31 | 69 | | 35 | 65 | | | | |
| Inside | | | Inside | | 3:1 | Inside | | 6:1 |
| | | | 27 | 73 | | 20 | 80 | |
| | | | 25 | 75 | | 10 | 90 | |
| | | | 21 | 79 | | 10 | 90 | |
| | | | 24 | 76 | | 15 | 85 | |
| Center | | 2:1 | Center | | 4:1 | Center | | 6:1 |
| 35 | 65 | | 19 | 81 | | 14 | 86 | |

TABLE 3

| Transition metals in the d-block | | | | | | | | | |
|---|---|---|---|---|---|---|---|---|---|
| Group 3 | 4 | 5 | 6 | 7 | 8 | 9 | 10 | 11 | 12 |
| Period 4 Sc 21 | Ti 22 | V 23 | Cr 24 | Mn 25 | Fe 26 | Co 27 | Ni 28 | Cu 29 | Zn 30 |
| Period 5 Y 39 | Zr 40 | Nb 41 | Mo 42 | Tc 43 | Ru 44 | Rh 45 | Pd 46 | Ag 47 | Cd 48 |
| Period 6 57-71 | Hf 72 | Ta 73 | W 74 | Re 75 | Os 76 | Ir 77 | Pt 78 | Au 79 | Hg 80 |
| Period 7 89-103 | Rf 104 | Db 105 | Sg 106 | Bh 107 | Hs 108 | Mt 109 | Ds 110 | Rg 111 | Cn 112 |

References (Each of which is expressly incorporated herein by reference in its entirety) and Notes:

1 Chen, J., Lim, B., Lee, E. P. & Xia, Y. Shape-controlled synthesis of platinum nanocrystals for catalytic and electrocatalytic applications. *NanoToday* 4, 81-95 (2009).
2 Kitchin, J. R., Norskov, J. K., Barteau, M. A. & Chen, J. Role of strain and ligand effects in the modification of the electronic and chemical properties of bimetallic surfaces. *Phys. Rev. Lett.* 93, 156801 (2004).
3 Kang, Y. et al. Highly active $Pt_3Pb$ and core-shell $Pt_3Pb$—Pt electrocatalysts for formic acid oxidation. *ACS Nano* 6, 2818-2825 (2012).
4 Zhang, L. et al. Platinum-based nanocages with subnanometer-thick walls and well-defined, controllable facets. *Science* 349, 412-416 (2015).
5 Strasser, P. et al. Lattice-strain control of the activity in dealloyed core-shell fuel cell catalysts. *Nat. Chem.* 2, 454-460 (2010).
6 Chen, C. et al. Highly crystalline multimetallic nanoframes with three-dimensional electrocatalytic surfaces. *Science* 343, 1339-1343 (2014).
7 Wu, Y. et al. Defect-dominated shape recovery of nanocrystals: a new strategy for trimetallic catalysts. *J. Am. Chem. Soc.* 135, 12220-12223 (2013).
8 Callister, W. D. & Rethwisch, D. G. *Materials Science and Engineering: An Introduction.* 8th edn, Vol. 7 (John Wiley & Sons, 2007).
9 Ringe, E., Van Duyne, R. & Marks, L. Wulff construction for alloy nanoparticles. *Nano Lett.* 11, 3399-3403 (2011).
10 Tian, N., Zhou, Z.-Y., Sun, S.-G., Ding, Y. & Wang, Z. L. Synthesis of tetrahexahedral platinum nanocrystals with high-index facets and high electro-oxidation activity. *Science* 316, 732-735 (2007).
11 Pan, J. *Ph.D. Dissertation: Evolution of Nanocrystals in Solution Phase: Synthesis, Shape Control and Growth Studies* Ph.D. thesis, Ph.D. Dissertation: "Evolution of nanocrystals in solution phase: synthesis, shape control and growth studies", State University of New York at Binghamton, (2013).
12 Roberts-Austen, W. C. The extraction of nickel from its ores by the mond process. *Nature* 59, 63-64 (1898).
13 Quan, Z., Wang, Y. & Fang, J. High-index faceted noble metal nanocrystals. *Acc. Che,. Res.* 46, 191-202 (2013).
14 Zhou, Y., Zhang, J., Su, G. & Li, J. From sphere to polyhedron: a hypothesis on the formation of high-index surfaces in nanocrystals. *Sci. Rep.* 4, 6520 (2014).
15 Gan, L. et al. Element-specific anisotropic growth of shaped platinum alloy nanocrystals. *Science* 346, 1502-1506 (2014).
16 Cui, C., Gan, L., Heggen, M., Rudi, S. & Strasser, P. Compositional segregation in shaped Pt alloy nanoparticles and their structural behaviour during electrocatalysis. *Nat. Mater.* 12, 765-771 (2013).
17 Ding, J. et al. Morphology and phase controlled construction of Pt—Ni nanostructures for efficient electrocatalysis. *Nano Lett.* 16, 2762-2767 (2016).
18 Li, G. G., Villarreal, E., Zhang, Q., Zheng, T., Zhu, J. J., & Wang, H. (2016). Controlled Dealloying of Alloy Nanoparticles toward Optimization of Electrocatalysis on Spongy Metallic Nanoframes. *ACS Applied Materials & Interfaces*, 8(36), 23920-23931.

19 Wang, X., Ruditskiy, A., & Xia, Y. (2016). Rational design and synthesis of noble-metal nanoframes for catalytic and photonic applications. National Science Review, nww062.

20 Weigand, P., Jelinek, B., Hofer, W. & Varga, P. Preferential sputtering and segregation reversal: (100) and (110) surfaces of $Pt_{25}Ni_{75}$ single crystal alloys. *Surf. Sci.* 301, 306-312 (1994).

21 Hofer, W. Surface segregation of PtNi alloys—comparing theoretical and experimental results. *Fresenius J. Anal. Chem.* 346, 246-251 (1993).

22 Stevens, D. A. & Dahn, J. R. Thermal degradation of the support in carbon-supported platinum electrocatalysts for PEM fuel cells. *Carbon* 43, 179-188 (2015).

23 Baturina, 0. A., Aubuchon, S. R. & Wynne, K. J. Thermal stability in air of Pt/C catalysts and PEM fuel cell catalyst layers. *Chem. Mater.* 18, 1498-1504 (2006).

24 Srivastava, R., Mani, P., Hahn, N. & Strasser, P. Efficient oxygen reduction fuel cell electrocatalysis on voltammetrically dealloyed Pt—Cu—Co nanoparticles. *Angew. Chem. Int. Ed.* 46, 8988-8991 (2007).

25 Marković, N. & Ross Jr, P. Surface science studies of model fuel cell electrocatalysts. *Surdf Sci. Rep.* 45, 117-229 (2002).

26 Parsons, R. & VanderNoot, T. The oxidation of small organic molecules: a survey of recent fuel cell related research. *J. Electroanal. Chem. Interf. Electrochem.* 257, 9-45 (1988).

27 Yang, H., Zhang, J., Sun, K., Zou, S. & Fang, J. Enhancing by weakening: electrooxidation of methanol on Pt3Co and Pt nanocubes. *Angew. Chem. Int. Ed.* 49, 6848-6851 (2010).

28 Stamenkovic, V. R. et al. Trends in electrocatalysis on extended and nanoscale Pt-bimetallic alloy surfaces. *Nat. Mater.* 6, 241-247 (2007).

29 Choi, S.-I. et al. Synthesis and characterization of 9 nm Pt—Ni octahedra with a record high activity of 3.3 A/mgPt for the oxygen reduction reaction. *Nano Lett.* 13, 3420-3425 (2013).

30 Zhang, J., Yang, H., Fang, J. & Zou, S. Synthesis and oxygen reduction activity of shape-controlled $Pt_3Ni$ nanopolyhedra. *Nano. Lett.* 10, 638-644 (2010).

31 Wang, Y. et al. Is CO adequate to facilitate the formation of $Pt_3M$ (M=Fe, Ni and Co) nanocubes? *Chem. Commun.* 49, 3955-3957 (2013).

32 Kresse, G. & Furthmüller, J. Efficiency of Ab-Initio Total Energy Calculations for Metals and Semiconductors using a Plane-Wave Basis Set. *Compt. Mater. Sci.* 6, 15-50, doi:doi:10.1016/0927-0256(96)00008-0 (1996).

33 Kresse, G. & Furthmüller, J. Efficient iterative schemes for ab initio total-energy calculations using a plane-wave basis set. *Phys. Rev. B* 54, 11169-11186 (1996).

34 Blöchl, P. E. Projector Augmented-Wave Method. *Phys. Rev. B* 50, 17953-17979 (1994).

35 Kresse, G. & Joubert, D. From Ultrasoft Pseudopotentials to the Projector Augmented-Wave Method. *Phys. Rev. B* 59, 1758-1775 (1999).

36 Perdew, J. P., Burke, K. & Ernzerhof, M. Generalized Gradient Approximation Made Simple. *Phys. Rev. Lett.* 77, 3865-3868 (1996).

37 Henkelman, G., Uberuaga, B. P. & Jonsson, H. A Climbing Image Nudged Elastic Band Method for Finding Saddle Points and Minimum Energy Paths. *J. Chem. Phys.* 113, 9901-9904 (2000).

38 Wang, Liang, and Yusuke Yamauchi. "Metallic nanocages: synthesis of bimetallic Pt—Pd hollow nanoparticles with dendritic shells by selective chemical etching." Journal of the American Chemical Society 135.45 (2013): 16762-16765.

39 Huang, Xiaoqing, et al. "Simplifying the Creation of Hollow Metallic Nanostructures: One-Pot Synthesis of Hollow Palladium/Platinum Single-Crystalline Nanocubes." Angewandte Chemie 121.26 (2009): 4902-4906.

40 Chen, Hao Ming, et al. "Hollow platinum spheres with nano-channels: synthesis and enhanced catalysis for oxygen reduction." The Journal of Physical Chemistry C 112.20 (2008): 7522-7526.

41 Chen, Yu, et al. "Hollow/rattle-type mesoporous nanostructures by a structural difference-based selective etching strategy." ACS Nano 4.1 (2009): 529-539.

42 Park, Ji Chan, et al. "Platinum-Centered Yolk-Shell Nanostructure Formation by Sacrificial Nickel Spacers†." Langmuir 26.21 (2010): 16469-16473.

43 Vasquez, Yolanda, Amandeep K. Sra, and Raymond E. Schaak. "One-pot synthesis of hollow superparamagnetic CoPt nanospheres." *Journal of the American Chemical Society* 127.36 (2005): 12504-12505.

44 Chang, Shery L Y, et al. "Stability of porous platinum nanoparticles: Combined in-situ TEM and theoretical study." *The Journal of Physical Chemistry Letters* 3.9 (2012): 1106-1110.

45 Xie, Shuifen, et al. "Synthesis of Pd—Rh Core-Frame Concave Nanocubes and Their Conversion to Rh Cubic Nanoframes by Selective Etching of the Pd Cores." Angewandte Chemie International Edition 51.41 (2012): 10266-10270.

46 Grass, Michael E., et al. "Silver ion mediated shape control of platinum nanoparticles: removal of silver by selective etching leads to increased catalytic activity." The Journal of Physical Chemistry C 112.13 (2008): 4797-4804.

47 Quan, Z., Wang, Y. & Fang, J. High-index faceted noble metal nanocrystals. Acc. Che,. Res. 46, 191-202, (2013).

48 Tian, N., Zhou, Z.-Y., Sun, S.-G., Ding, Y. & Wang, Z. L. Synthesis of tetrahexahedral platinum nanocrystals with high-index facets and high electro-oxidation activity. *Science* 316, 732-735, (2007).

49 Barnard, A. S., Rep. Prog. Phys., 73:086502, 2010; A. S. Barnard. Comp. Phys. Comm., 182:11 (2011).

50 Oh, Aram, suck Baik, Dong Shin Choi, Jae Yeong aeon, Byeongyoon Kim, Heejin Kim, Seong Jung Kwon, Sang Hoon Joo, Yousung, Jung, and Kwangyeol Lee "Skeletal octahedral nanoframe with cartesian coordinates via geometrically precise nanoscale phase segregation in a Pt@Ni core-shell nanocrystal." ACS nano 9, no. 3 (2015): 2856-2867.

51 Meyer, D. A.; Oliver, J. A.; Albrecht, R. M. Detection of Nanoparticles of Differing Composition for High Resolution Labeling. Microsc. Microanal. 2010, 16, 992-993.

52 Beckneil, Nigel, Yijin Kang, Chen Chen, Joaquin Resa.sco, Nikolay Komienko, Jinghua Guo, Nenad M. Markovic, Gabor A. Somorjai, Vojislav R. Stamenkovic, and Peidong Yang. "Atomic structure of Pt3Ni nanoframe electrocatalysts by in situ X-ray absorption spectroscopy." *J. Am. Chem. Soc* 137, no. 50 (2015): 15817-15824.

53 Wang, Y., Chen, Y., Nan, C., Li, L., Wang, D., Peng, Q., & Li, Y. (2015). Phase-transfer interface promoted corrosion from PtNi10 nanoctahedra to Pt4Ni nanoframes. *Nano Research*, 8(1), 140-155.

54 Yang, Peidong, Vojislav Stamenkovic, Gabor A. Somorjai, Nenad Markovic, Chen Chen, Yijin Kang, and Nigel H. Becknell. "Nanoframes with three-dimensional electrocatalytic surfaces." U.S. patent application Ser. No. 14/625,443, filed Feb. 18, 2015.

55 Lee, Ki Woong. "Morphological evolution of 2D Rh nanoplates to 3D Rh concave nanotents, hierarchically stacked nanoframes, and hierarchical dendrites." Nanoscale 7, no. 8 (2015): 3460-3465.

56 Cheng, Daojian, Wenchuan Wang, Dapeng Cao, and Shiping Huang. "Simulating synthesis of metal nanorods, nanoplates, and nanoframes by self-assembly of nanoparticle building blocks." The Journal of Physical Chemistry C 113, no. 10 (2009): 3986-3997.

57 Niu, Zhiqiang, Nigel Becknell, Yi Yu, Dohyung Kim, Chen Chen, Nikolay Kornienko, Gabor A. Somorjai, and Peidong Yang. "Anisotropic phase segregation and migration of Pt in nanocrystals en route to nanoframe catalysts." Nature Materials, 15, 1188-1194 (2016).

58 Ren, Fumin, Zheng Wang, Liangfeng Luo, Haiyuan Lu, Gang Zhou, Weixin Huang, Xun Hong, Yuen Wu, and Yadong Li. "Utilization of Active Ni to Fabricate Pt—Ni Nanoframe/NiAl Layered Double Hydroxide Multifunctional Catalyst through in situ Precipitation." Chemistry—A European Journal 21, no. 38 (2015): 13181-13185

59 Li, Zhi, Rong Yu, Jinglu Huang, Yusheng Shi, Diyang Zhang, Xiaoyan Zhong, Dingsheng Wang, Yuen Wu, and Yadong Li. "Platinum-nickel frame within metal-organic framework fabricated in situ for hydrogen enrichment and molecular sieving." Nature communications 6, 8248 (2015). Doi:10.1038/ncomms9248

20160355934; 20160303548; 20160301085; 20160290223; 20160288102; 20160233519; 20160233517; 20160233516; 20160226078; 20160226073; 20160181622; 20160178229; 20160141630; 20160126562; 20160087282; 20160036065; 20150236355; 20150147682; 20150050583; 20150030968; 20150030966; 20150017570; 20150014167; 20150004445; 20140349203; 20140326611; 20140227632; 20140186744; 20140171297; 20140171290; 20140106261; 20130344421; 20130319871; 20130252132; 20130209898; 20130199673; 20130164652; 20130150231; 20130133483; 20130085061; 20130071771; 20130059231; 20130053239; 20130045859; 20130040227; 20130022891; 20130004885; 20120316054; 20120251926; 20120215043; 20120208693; 20120178018; 20120135862; 20120094199; 20120065052; 20110256472; 20110212386; 20110197710; 20110195347; 20110177938; 20110165496; 20110143263; 20110118110; 20110086295; 20110082222; 20110077147; 20100330452; 20100297904; 20100273085; 20100222211; 20100183942; 20100159305; 20100151298; 20100120942; 20100105548; 20100092841; 20100086832; 20100048388; 20100047662; 20100035047; 20090317308; 20090247400; 20090227445; 20090220835; 20090081527; 20090042093; 20090042089; 20080305946; 20080153722; 20080087574; 20080038623; 20070166600; 20070166590; 20070101824; 20070003822; 20060292434; 20060280997; 20060269824; 20060251952; 20060240293; 20060166052; 20060157384; 20060141334; 20060116285; 20060058185; 20050112451; 20050069755; 20040248730; 20040122264; 20040077906; 20040038808; 20060141268; 20060039848; 20150367031; 20150236355; 20150147609; 20150069015; 20140272483; 20120175585; 9,496,561; 9,478,319; 9,440,224; 9,437,876; 9,425,462; 9,404,045; 9,391,339; 9,272,334; 9,246,177; 9,214,680; 9,138,727; 9,105,934; 9,101,915; 9,054,355; 8,993,472; 8,906,984; 8,900,773; 8,895,206; 8,859,458; 8,815,468; 8,748,334; 8,748,330; 8,747,650; 8,709,964; 8,691,717; 8,658,559; 8,652,987; 8,623,779; 8,569,196; 8,557,484; 8,501,366; 8,338,051; 8,304,362; 8,288,308; 8,247,136; 8,227,372; 8,187,769; 8,105,968; 8,058,204; 7,906,243; 7,892,694; 7,887,963; 7,871,738; 7,811,965; 7,811,959; 7,727,376; 7,718,304; 7,713,899; 7,662,740; 7,642,213; 7,432,221; 7,419,741; 7,098,163; 7,038,093; 6,936,738; 6,096,675; 6,096,193; 6,063,724; 5,540,833; 4,126,934; 9,176,140; 9,023,223; 8,980,454; 8,206,537; 7,824,467; and 7,816,297, each of which is expressly incorporated herein by reference in its entirety.

It is understood that this broad invention is not limited to the embodiments discussed herein, but rather is composed of the various combinations, sub-combinations and permutations thereof of the elements disclosed herein, including aspects disclosed within the incorporated references. The invention is limited only by the following claims. Each claim is combinable with each other claim unless expressly inconsistent.

Various physical arrangements of components and various step sequences also fall within the intended scope of the invention. Many additional modifications are intended in the foregoing disclosure, and it will be appreciated by those of ordinary skill in the art that in some instances some features of the invention will be employed in the absence of a corresponding use of other features.

While several specific implementation details are contained in the above discussion, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of forming particles, comprising:
providing Pt—Ni precursor particles having a bulk ratio of Pt to Ni of less than 4:1;
supplying carbon monoxide under reaction conditions which differentially remove Ni from Pt—Ni precursor particles at a faster rate than Pt; and
maintaining the reaction conditions until at least a portion of the particles have at least one portion having an enriched ratio of Pt to Ni of greater than or equal to 4:1.

2. The method according to claim 1, wherein the Pt—Ni precursor particles comprise $PtNi_4$.

3. The method according to claim 1, wherein the Pt—Ni precursor particles have a bulk ratio of Pt to Ni of at least 3:1.

4. The method according to claim 1, wherein at least 50 mol % of the nickel is removed from the precursor particles with respect to the particles.

5. The method according to claim 1, wherein the particles are nanocrystals.

6. The method according to claim 1, wherein the particles are formed under non-aqueous reaction conditions.

7. The method according to claim 1, wherein the precursor particles are prepared through a colloidal synthesis process.

8. A Pt—Ni nanoparticle, comprising a segregated Pt thin layer having a Pt to Ni ratio of at least 4:1, strained to Pt—Ni alloy surfaces.

9. The Pt—Ni nanoparticle according to claim 8, wherein the nanoparticle has a down-shift d-band center.

10. The Pt—Ni nanoparticle according to claim 8, formed by a process comprising:
   providing a precursor particle comprising a platinum-nickel alloy;
   supplying carbon monoxide under reaction conditions which differentially remove nickel from the precursor particles at a faster rate than platinum; and
   maintaining the reaction conditions until the precursor particle is converted to the Pt—Ni nanoparticle having the segregated Pt thin layer having a Pt to Ni ratio of at least 4:1.

11. The Pt—Ni nanoparticle according to claim 10, wherein the precursor particle comprises $PtNi_4$.

12. The Pt—Ni nanoparticle according to claim 10, wherein the nanoparticle has a bulk ratio of Pt to Ni of at least 3:1.

13. The Pt—Ni nanoparticle according to claim 10, wherein at least 50 mol % of the nickel is removed from the precursor particle with respect to the nanoparticle.

14. The Pt—Ni nanoparticle according to claim 10, wherein the particle is formed under non-aqueous reaction conditions.

15. The Pt—Ni nanoparticle according to claim 10, wherein the precursor particle is prepared through a colloidal synthesis process.

16. A metallic nanoparticle, formed by a process comprising:
   providing a precursor nanoparticle comprising a Pt—Ni metal alloy having a Pt:Ni ratio of less than 4:1;
   supplying carbon monoxide under reaction conditions which differentially remove Ni from the Pt—Ni metal alloy of the precursor nanoparticle at a faster rate than Pt; and
   maintaining the reaction conditions until the precursor nanoparticle is converted to a nanoparticle comprising a surface layer portion layer having a Pt to Ni ratio of at least 4:1, strained to a Pt—Ni alloy surface having a lower Pt to Ni ratio.

17. The metallic nanoparticle according to claim 16, wherein the precursor nanoparticle has a carbon core.

18. The metallic nanoparticle according to claim 16, wherein the nanoparticle is configured to catalyze at least one oxidation-reduction reaction (ORR) chemical reaction.

19. The metallic nanoparticle according to claim 16, wherein the nanoparticle comprises a segregated platinum thin layer strained to the platinum-nickel alloy surfaces having a down-shift d-band center.

20. The metallic nanoparticle according to claim 16, wherein at least 50 mol % of the Ni is removed from the precursor nanoparticle with respect to the nanoparticle.

* * * * *